(12) United States Patent
Ito

(10) Patent No.: US 7,885,364 B2
(45) Date of Patent: Feb. 8, 2011

(54) WIRELESS COMMUNICATION SYSTEM, RECEIVER, DEMODULATION METHOD USED FOR THE SYSTEM AND RECEIVER, AND PROGRAM THEREOF

(75) Inventor: Takumi Ito, Tokyo (JP)

(73) Assignee: NEC Corporation, Tokyo (JP)

( * ) Notice: Subject to any disclaimer, the term of this patent is extended or adjusted under 35 U.S.C. 154(b) by 1355 days.

(21) Appl. No.: 11/336,910

(22) Filed: Jan. 23, 2006

(65) Prior Publication Data

US 2006/0165192 A1 Jul. 27, 2006

(30) Foreign Application Priority Data

Jan. 24, 2005 (JP) .............................. 2005-015595

(51) Int. Cl.
*H04B 7/10* (2006.01)

(52) U.S. Cl. ...................... 375/347; 375/144; 375/148; 375/299; 375/348; 375/232

(58) Field of Classification Search ................. 375/347, 375/144, 148, 232, 299, 348
See application file for complete search history.

(56) References Cited

U.S. PATENT DOCUMENTS

| | | | | |
|---|---|---|---|---|
| 6,564,036 | B1 * | 5/2003 | Kasapi | ........................... 455/1 |
| 7,183,974 | B1 * | 2/2007 | Minkoff | ..................... 342/377 |
| 2001/0020918 | A1 * | 9/2001 | Takai | .......................... 343/729 |
| 2002/0181629 | A1 * | 12/2002 | Shibata | ....................... 375/347 |
| 2004/0209579 | A1 * | 10/2004 | Vaidyanathan | .............. 455/101 |

FOREIGN PATENT DOCUMENTS

| | | |
|---|---|---|
| JP | 2001-505008 A | 4/2001 |
| JP | 2001-217773 A | 8/2001 |
| JP | 2001-257521 A | 9/2001 |
| JP | 2001-268624 A | 9/2001 |
| JP | 2002-359588 A | 12/2002 |
| JP | 2004-135120 A | 4/2004 |
| JP | 2004-511142 A | 4/2004 |
| JP | 2004-215254 A | 7/2004 |
| JP | 2004-228819 A | 8/2004 |
| WO | WO 98/16077 A2 | 4/1998 |
| WO | WO 02/28120 A2 | 4/2002 |

OTHER PUBLICATIONS

Jiang Yue, et al. "Channel Estimation and Data Detection for MIMO-OFDM Systems," IEEE, GLOBECOM 2003, pp. 581-585, United States.

Maeda, N., et al., "MLD with QR Decomposition Using Bi-Directional Ranking and Selection of Surviving Symbol Replica for VSF-Spread OFDM MIMO Multiplexing", The Institute of Electronics, Information and Communication Engineers: Technical Report of IEICE, 2004, pp. 32-38, vol. 104.

* cited by examiner

*Primary Examiner*—Shuwang Liu
*Assistant Examiner*—Kabir A Timory
(74) *Attorney, Agent, or Firm*—Sughrue Mion, PLLC

(57) ABSTRACT

In a wireless communication system having a receiver which receives, through plural reception antennae, signals transmitted from plural transmission antennae, bit likelihood can be surely calculated without requiring a selection processing. A transmitter has M transmission antennae, and transmits signals through the transmission antennae, respectively. A receiver has N reception antennae, and receives signals. K nulling devices perform nulling with use of signals received, and output part of nulling signals. K demodulation devices are inputted with nulling signals, demodulate signals, and output demodulated signals. A parallel-serial conversion device is inputted with demodulated signals, converts the parallel format thereof into a serial format, and outputs the result as demodulated data.

25 Claims, 19 Drawing Sheets

US 7,885,364 B2

WIRELESS COMMUNICATION SYSTEM, RECEIVER, DEMODULATION METHOD USED FOR THE SYSTEM AND RECEIVER, AND PROGRAM THEREOF

BACKGROUND OF THE INVENTION

1. Field of the Invention

The present invention relates to a wireless communication system, a receiver, a demodulation method used in the system and receiver, and a program thereof, and particularly to a demodulation method in a receiver in a wireless communication system using plural transmission/reception antennae.

2. Description of the Related Art

In a wireless communication system in which a signal transmitted from a transmitter having plural transmission antennae is received by a receiver have plural reception antennae, studies have been made of a lot of techniques to reduce the scale of calculation in the receiver. With reference to FIG. 19, a description will now be made of a scheme according to a non-patent document 1 (Jiang Yue, Kyeong Jin Kim; Gibson, J. D.; Iltis, R. A., "Channel Estimation and Data Detection for MIMO-OFDM Systems," In Proc. Of IEEE Intl. Conf. On Global Telecommunications Conference, Vol. 2, pp. 581-585, December 2003).

FIG. 19 is a block diagram showing the configuration of the scheme of the non-patent document 1. Referring to FIG. 19, this system is constituted by a transmitter 6 having four transmission antennae 21-1 to 21-4, and a receiver 12 having four reception antennae 11-1 to 11-4. Further, the receiver 12 has a QR-decomposition device 121, a $Q^H$-calculation device 122, a demodulation device 123, and a parallel-serial conversion device 54. The transmission antennae 21-1 to 21-4 of the transmitter 6 each transmit any of 16 values. The receiver 12 has four reception antennae 11-1 to 11-4 and respectively receive signals r1, r2, r3, and r4.

Suppose now that the channel coefficient of a signal path constituted by the transmission antennae 21-$m$ (m is 1 to 4) and the reception antennae 11-$n$ (n is 1 to 4) is hmn (h11 to h14, h21 to h24, . . . , h41 to h44). Transmission signals s1 to s4 and received signals r1 to r4 are related to each other, as expressed by the following formulas below with use of the channel coefficient hmn.

$r1 = h11s1 + h12s2 + h13s3 + h14s4 + n1$ $r2 = h21s1 + h22s2 + h23s3 + h24s4 + n2$ $r3 = h31s1 + h32s2 + h33s3 + h34s4 + n3$ $r4 = h41s1 + h42s2 + h43s3 + h44s4 + n4$ [Formula 1]

In these formulas, n1 to n4 respectively represents noises added to the received signals r1 to r4.

Suppose now that a vector having the received signals r1 to r4 as elements of itself is a received-signal vector r, a matrix having channel coefficients h11 to h44 as elements of itself is a channel matrix H, a vector having transmission signals s1 to s4 as elements of itself is a transmission-signal vector s, and a vector having as elements of itself noises n1 to n4 added to the received signals r1 to r4 is a noise vector n. Then, the above formula 1 can be expressed as follows, in a form using matrices.

$$r = \begin{pmatrix} r1 \\ r2 \\ r3 \\ r4 \end{pmatrix} = \begin{pmatrix} h11 & h12 & h13 & h14 \\ h21 & h22 & h23 & h24 \\ h31 & h32 & h33 & h34 \\ h41 & h42 & h43 & h44 \end{pmatrix} \begin{pmatrix} s1 \\ s2 \\ s3 \\ s4 \end{pmatrix} + \begin{pmatrix} n1 \\ n2 \\ n3 \\ n4 \end{pmatrix} = Hs + n \quad \text{[Formula 2]}$$

The QR-decomposition device 121 estimates a channel matrix H by use of received signals r1 to r4, and carries out QR-decomposition. Suppose that the result thereof is H=QR. Q is a unitary matrix (hereinafter called a Q-matrix) and R is an upper triangular matrix (hereinafter called a R-matrix) having a real number of a diagonal element.

The $Q^H$-calculation device 122 multiplies the received-signal vector r by a complex conjugate transposition of the Q-matrix, thereby to output nulling signals z1 to z4 in which the received signals r1 to r4 are subjected to coordinate transformation. Note that the Q-matrix satisfies $Q^H Q = I$ (I is a unit matrix). A nulling signal vector z which takes the nulling signals z1 to z4 as elements can be expressed as $z = Q^H r = Rs + Q^H n$. At this time, the R-matrix is an upper triangular matrix, and hence, the following is given.

$$\begin{pmatrix} z1 \\ z2 \\ z3 \\ z4 \end{pmatrix} = \begin{pmatrix} r11 & r12 & r13 & r14 \\ 0 & r22 & r23 & r24 \\ 0 & 0 & r33 & r34 \\ 0 & 0 & 0 & r44 \end{pmatrix} \begin{pmatrix} s1 \\ s2 \\ s3 \\ s4 \end{pmatrix} + \begin{pmatrix} n1 \\ n2 \\ n3 \\ n4 \end{pmatrix} \quad \text{[Formula 3]}$$

All of the elements (r1 to r4) constituting the received-signal vector r depend on the transmission signals s1 to s4. In contrast, of the elements (z1 to z4) constituting the nulling signal vector z, z4 depends only on the transmission signal s4, as well as z3 on the transmission signals s3 and s4, z2 on the transmission signals s2, s3, and s4, and z1 on the transmission signals s1 to s4.

Therefore, at the time of performing demodulation with use of a replica signal of a received signal, the number of replicas can be reduced more essentially in the case of using a nulling signal obtained by performing coordinate transformation on the received signal than in the case of directly using a received signal.

Generally in a maximum likelihood detection, all signal candidates that may have been used at the time of transmission are used to calculate replicas of received signals. The calculated replicas and actually received signals are compared with each other. Demodulation is carried out supposing that among replicas, the signal that gives the closest received signals was transmitted.

In contrast, in the scheme according to the non-patent document 1, replicas are generated in the order of the nulling signals z4 to z3 to z2 to z1. At this time, the number of signal candidates for which replicas of nulling signals are generated is limited to M, in each stage, thereby to reduce greatly the calculation amount (this is called a "M algorithm").

The demodulation device 123 is inputted with a R-matrix and a nulling signal vector z and demodulates a signal by a maximum likelihood detection to which the M algorithm is applied. In this case, the number of errors that are selected by the M-algorithm and the number of signal candidates that give the errors are both 16.

At first, attention is paid to $z4 = r44 s4 + n4$ in the above formula 3. Since n4 is a noise signal, it is very difficult for the receiver 12 to estimate n4. Hence, signal candidates of r44 and the transmission signal s4 are used to calculate a replica signal with respect to the nulling signal $z4$. The transmission signal $s4$ is a signal consisting of any of 16 values. If the values which the transmission signal $s4$ can take are $c1$ to $c16$, the replica signals of the nulling signals $z4$ can be calculated as $r4\text{-}1 = r44c1$, $r4\text{-}2 = r44c2$, ..., $r4\text{-}16 = r44c16$. Next, errors between calculated 16 replica signals $r4\text{-}1$ to $r4\text{-}16$ and the nulling signal $z4$ are obtained. Since the number of all signal candidates is 16, a selection processing based on the M-algorithm is not required.

Next, in the above formula 3, attention is paid to $z3 = r33s3 + r34s4 + n3$. The transmission signal $s3$ is also constituted by any of 16 values. With use of $r33$, $r34$, and signal candidates of transmission signals $s3$ and $s4$, the replica signal of the nulling signal $z3$ can be calculated as $z3\text{-}1 = r33c1 + r34c1$, $z3\text{-}2 = r33c1 + r34c2$, ..., $z3\text{-}256 = r33c16 + r34c16$. Errors between obtained replica signals $z3\text{-}1$ to $z3\text{-}256$ and the nulling signal $z3$ are obtained.

Since there are 256 sets of signal candidates for the transmission signals $s3$ and $s4$ at present, a selection processing of selecting 16 sets by the M-algorithm is required. This processing can be achieved by obtaining and selecting 16 sets of transmission signal candidates which have small errors with respect to nulling signals $z3$ and $z4$, with use of 16 replicas calculated for the nulling signal $z4$ and 256 replicas calculated for the nulling signal $z3$.

Next, replicas of the nulling signal $z2$ are calculated. At this time, the number of signal candidates for the transmission signals $s3$ and $s4$ is 16 sets. There are also 16 signal candidates for $s2$. Therefore, 256 replica signals of the nulling signal $z2$ can be calculated. In this case, a processing of selecting 16 replica signals by the M-algorithm is required, too. 256 replicas are calculated for the nulling signal $z1$. Together with 16 replicas of the nulling signals $z2$, $z3$, and $z4$, the most probable sets of signal candidates for the transmission signals $s1$, $s2$, $s3$, and $s4$ are finally selected and outputted as demodulated signals $s1$, $s2$, $s3$, and $s4$.

The parallel-serial conversion device 54 performs parallel-serial conversion on these demodulated signals $s1$, $s2$, $s3$, and $s4$, and outputs the conversion results as demodulated data $s1$, $s2$, $s3$, and $s4$ in a serial format.

In the case of using an error correction code or the like, the receiver 12 which calculates the bit likelihood calculates the likelihood from finally obtained signal candidates and errors thereof. The likelihood can be calculated as follows.

Usually, any of 0000 to 1111 is assigned to each of signals candidates $c1$ to $c6$ for each transmission signal. The bit likelihood means probability at which the bit at a particular position is 0 and probability at which the same bit is 1 where attention is paid to a particular bit position. This can be approximated by an error finally calculated according to the present scheme. For example, to obtain probability at which the bit at a bit position is 0, those signal candidates that have 0 at the bit position are searched for from signal candidates finally obtained. Among final errors calculated from the signal candidates, the smallest one is selected. This operation is performed repeatedly with respect to 0 and 1 at all bit positions, and the bit likelihood is obtained for every bit.

The related art described above requires that replica calculation should be executed $16 + 256 + 256 + 256 = 784$ times in order to calculate demodulated signals or bit likelihood. With respect to $z3$ and $z2$, a selection processing of selecting 16 from 256 is required. With respect to $z1$, a selection processing of selecting 1 from 256 is required.

However, the related art as described above has problems as follows.

The first problem is that a lot of selection processings are necessary and cause a processing delay. This is because selection of signal candidates and errors is carried out by the M-algorithm.

The second problem is that bit likelihood cannot be calculated in some cases. This is because signal candidates finally obtained may cause a case that all the bits at a particular bit position are 0 or 1.

The third problem is that regardless of the states of channels, a constant processing is carried out. Therefore, setting of the numbers of remaining candidates is not always efficient. This is because the receiver does not carry out proper control corresponding to quality.

SUMMARY OF THE INVENTION

An object of the present invention is to construct a receiver in a wireless communication system having a receiver by which a signal transmitted through plural transmission antennae is received through plural reception antennae, the receiver being capable of steadily calculating bit likelihood without requiring a selection processing.

Another object of the present invention is to construct a receiver capable of performing efficient adaptive control, corresponding to states of channels, in addition to the capability as described above.

To solve the above problems, a wireless communication system according to the first aspect of the present invention has a receiver comprising two or more reception antennae, two or more adaptive nulling devices, and an adaptive demodulation device, and receives signals transmitted from a transmitter having two or more transmission antennae. Since this structure is adopted, a receiver can be constructed with capability to calculate bit likelihood steadily, without requiring a selection processing.

In a wireless communication system according to the second aspect of the present invention, the adaptive demodulation device comprised in the wireless communication system of the first aspect has a selection/combining device, and performs one or both of selection and combining. Since this structure is adopted, a receiver can be constructed with capability to calculate bit likelihood steadily, without requiring a selection processing.

In a wireless communication system according to the third aspect of the present invention, the adaptive nulling devices comprised in the wireless communication system of the first aspect have a rearrangement control device, and determine a rearrangement in nulling devices, based on the channel quality of signals. Since this structure is adopted, a receiver can be constructed with capability to calculate bit likelihood steadily, without requiring a selection processing, and to perform efficient control in compliance with states of channels.

In a wireless communication system according to the fourth aspect of the present invention, the adaptive demodulation device comprised in the wireless communication system of the first aspect has a switching control device, and controls demodulation devices to be operated, based on the channel quality of signals. Since this structure is adopted, a receiver can be constructed with capability to calculate bit likelihood steadily, without requiring a selection processing, and to perform efficient adaptive control in compliance with states of channels.

In a wireless communication system according to the fifth aspect of the present invention, the adaptive nulling devices comprised in the wireless communication system of the first aspect has an output-number switching device, and the adoptive demodulation device has a demodulation-signal-number switching device. Based on the channel quality of signals, the number of nulling signals outputted from each adaptive nulling device and the number of signals demodulated by the demodulation device are controlled. Since this structure is adopted, a receiver can be constructed with capability to calculate bit likelihood steadily, without requiring a selection processing, and to perform efficient adaptive control in compliance with states of channels.

The wireless communication system according to the present invention has been accomplished on the basis of conception as described above. According to the present invention, there is provided a wireless communication system comprising a receiver, which has N reception antennae (where N is an integer not smaller than 2) and receives and demodulates transmission signals from a transmitter having M transmission antennae (where M is an integer not smaller than 2), wherein the receiver comprises: K adaptive nulling means of first to K-th adaptive nulling means (where K is not smaller than 2 and not greater than M) connected to the N reception antennae; and an adaptive demodulation means connected to the K-th adaptive nulling means, wherein the K adaptive nulling means includes k-th adaptive nulling means (where k is an integer not smaller than 1 and not greater than K) configured to orthogonalize received signals received by the reception antennae, with use of a matrix having, as its elements, channel coefficients between the reception antennae and the transmission antennae, to generate and output Lk nulling signals (where Lk is an integer not smaller than 1 and smaller than M and k denotes the k-th adaptive nulling means and is not smaller than 1 and not greater than K), and the adaptive demodulation means demodulates the received signals with use of the nulling signals, and outputs the received signals demodulated.

According to the present invention, a receiver capable of steadily calculating bit likelihood without requiring a selection processing can be constructed in a wireless communication system having a kind of receiver which receives, with use of plural reception antennae, signals transmitted from plural transmission antennae. In addition, the receiver can also be constructed with capability of performing efficient adaptive control in compliance with states of channels.

DETAILED DESCRIPTION OF THE PREFERRED EMBODIMENTS

Preferred embodiments of the present invention will now be described in details below with reference to the drawings.

First Embodiment

Figure 1:
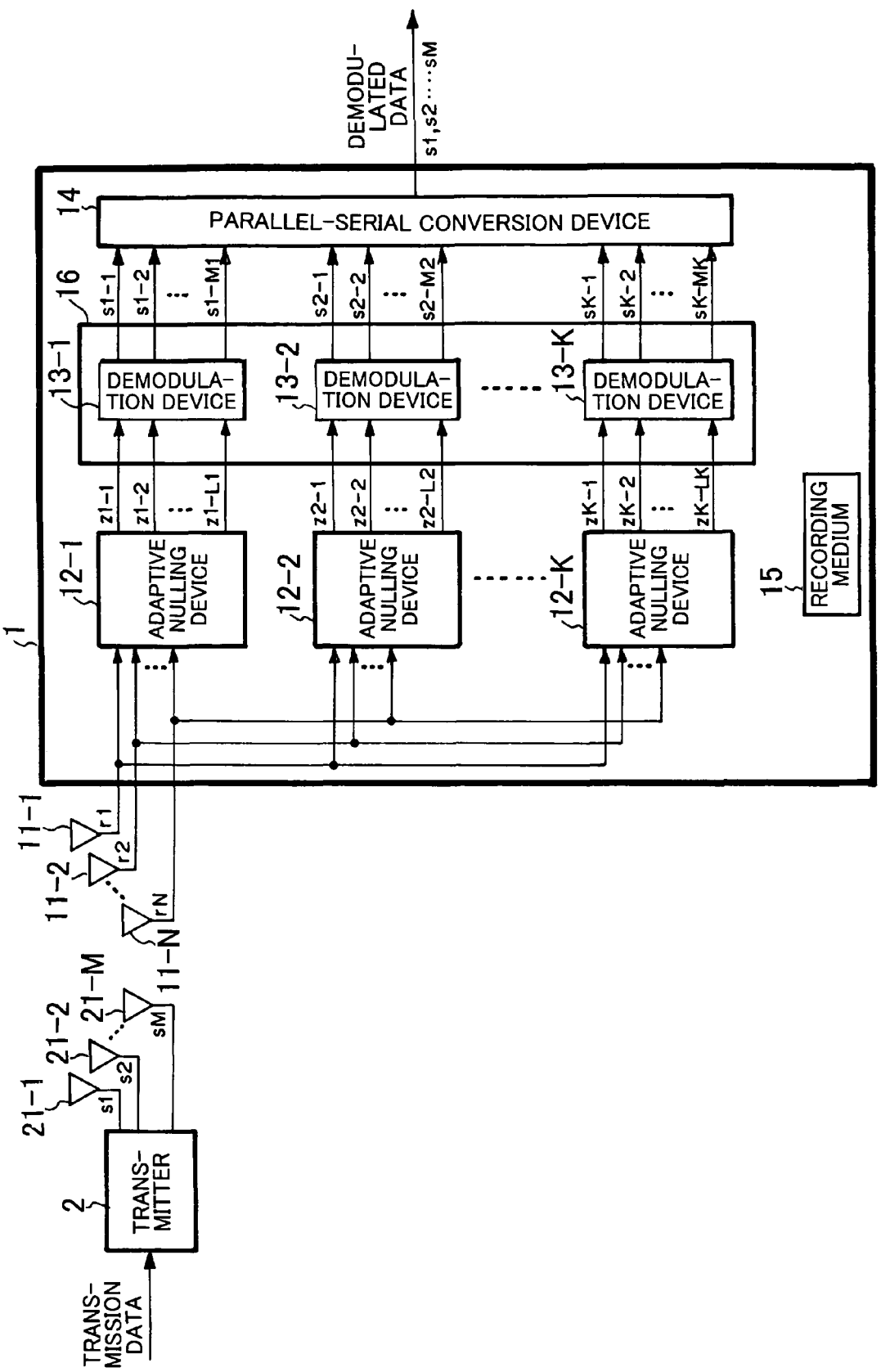
FIG. 1 is a block diagram showing the structure of a wireless communication system according to the first embodiment of the present invention.

FIG. 1 is a block diagram showing the structure of the first embodiment of the present invention.

Referring to FIG. 1, the wireless communication system according to the present embodiment has a structure including a transmitter 2 and a receiver 1. The transmitter 2 generates transmission signals s1 to sM (M is an integer not smaller than 2) from transmission data and transmits the transmission signals s1 to sM through M transmission antennae 21-1 to 21-M. The receiver 1 receives the signals from the transmitter 2 through N reception antennae 11-1 to 11-N (N is an integer not smaller than 2) and demodulates and outputs the received signals r1 to rN.

The receiver 1 has K adaptive nulling devices 12-1 to 12-K (K is an integer not smaller than 2 and not greater than M), an adaptive demodulation device 16, a parallel-serial conversion device 14, and a recording medium 15. The adaptive nulling devices 12-1 to 12-K are connected to the output sides of the N reception antennae 11-1 to 11-N, and perform nulling of respective received signals r1 to rN. The adaptive demodulation device 16 is connected to the output sides of the K adaptive nulling devices 12-1 to 12-K, and performs demodulation of signals. The parallel-serial conversion device 14 is connected to the output side of the adaptive demodulation device 16 and performs parallel-serial conversion on the signals. The recording medium 15 is connected to a calculation device (not shown) in the receiver 1 and stores a program to realize processing of respective sections in the receiver 1.

The K adaptive nulling devices 12-1 to 12-K perform nulling on N signals r1 to rN received through the N reception antennae 11-1 to 11-N, and respectively output nulling signals z1-1 to z1-L1, ..., zK-1 to zK-LK to the adaptive demodulation device 16.

Among the K adaptive nulling devices 12-1 to 12-K, the k-th adaptive nulling device 12-k will be described first. Where signals received by the reception antennae 11-1 to 11-N are respectively r1 to rN, the received-signal vector r can be expressed as r=(r1, r2, ..., rN). The k-th adaptive nulling device 12-k performs nulling supposing zk=Ak*r by the k-th nulling matrix. In this expression, zk is the k-th nulling signal vector constituted by a signal subjected to nulling, and Ak is the k-th nulling matrix. Where Ak is a matrix of M rows×N columns, zk is a nulling signal vector having M nulling signals as elements of itself. The k-th nulling device 12-k outputs Lk nulling signals zk-1 to zk-Lk among the M nulling signals zk-1 to zk-M.

The adaptive demodulation device 16 has K demodulation devices 13-1 to 13-K connected respectively to outputs of the K adaptive nulling devices 12-1 to 12-K. The K demodulation devices 13-1 to 13-K are inputted with the nulling signals z1-1 to z1-L1, ..., zK-1 to zK-LK from the K adaptive nulling devices 12-1 to 12-K, perform signal demodulation, and output demodulated signals s1-1 to s1-M1, ..., sK-1 to sK-MK to the parallel-serial conversion device 14.

Among these K demodulation devices 13-1 to 13-K, the k-th demodulation device 13-k is inputted with Lk nulling signals, performs signal demodulation, and outputs demodulated signals sk-1 to sk-Mk.

The parallel-serial conversion device 14 converts the demodulated signals s1-1 to s1-M1, ..., sK-1 to sK-MK demodulated by the K demodulation devices 13-1 to 13-K, into a serial format, and outputs the result as demodulated data s1 to sM.

Figure 2:
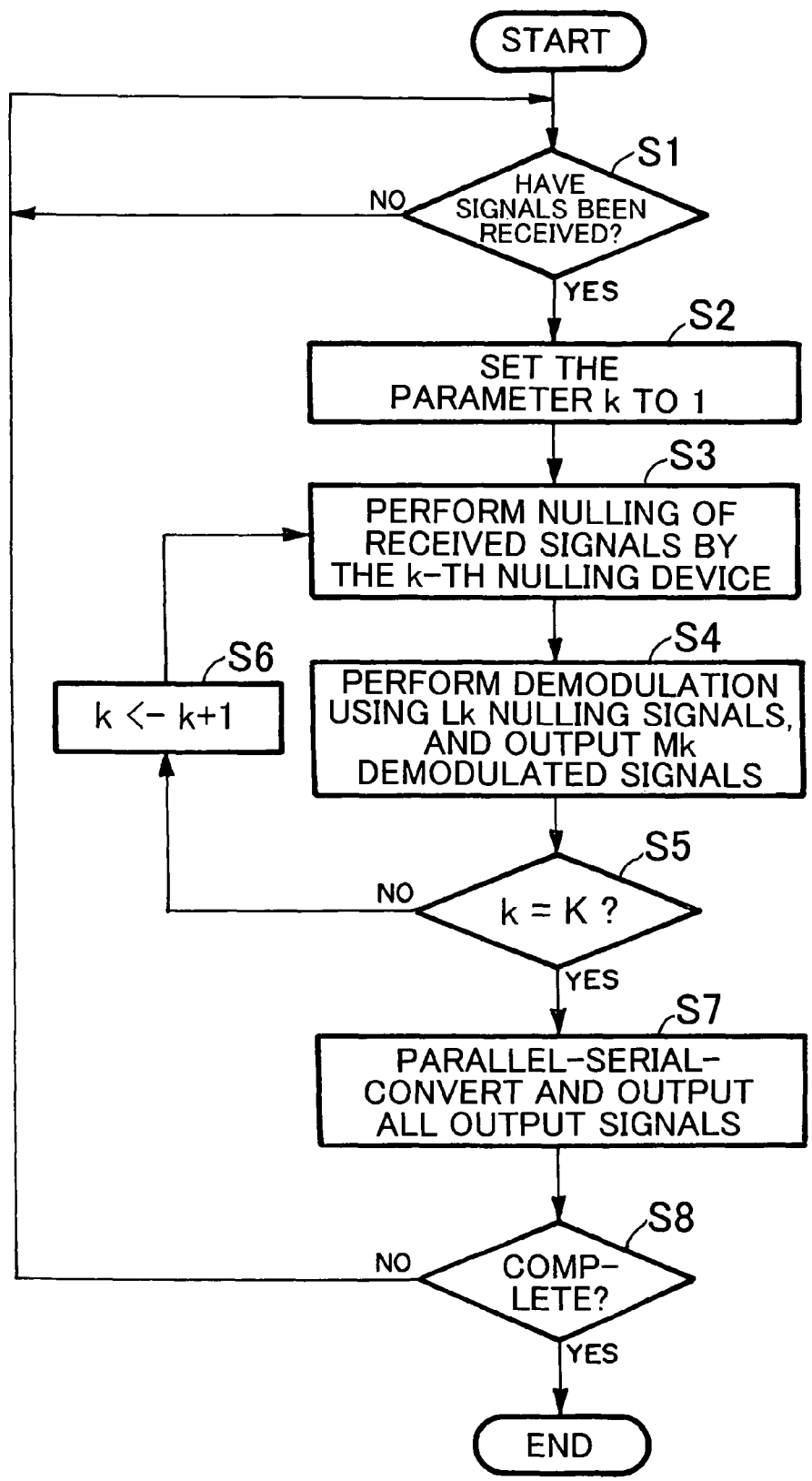
FIG. 2 is a flowchart showing a demodulation processing executed by a receiver shown in FIG. 1.

FIG. 2 is a flowchart showing operation of the present embodiment. The processing shown in FIG. 2 is realized as a calculation device (not shown) in the receiver 1 executes a program stored in the recording medium 15.

In FIG. 2, at first, the N reception antennae 11-1 to 11-N respectively receive signals (step S1: YES). Next, the receiver 1 sets the parameter k to 1 (step S2). The first adaptive nulling device 12-1 among the K adaptive nulling devices 12-1 to 12-K performs the first nulling on a received signal (step S3), and outputs L1 (L1 is not smaller than 2 and not greater than M) nulling signals z1-1 to z1-L1. Next, the first demodulation device 13-1 among the K demodulation devices 13-1 to 13-K is inputted with L1 nulling signals z1-1 to z1-L1, performs a demodulation processing, and outputs demodulated signals s1-1 to s1-M1 (M1 is not smaller than 1 and not greater than L1) (step S4).

Next, whether the parameter k is equal to K or not is checked (step S5). If the parameter k is not equal to K (step S5: NO), the parameter k is incremented by one (step S6). The processing returns to the step S3 and repeats the same steps as above. Otherwise, if the parameter k is equal to K (step S5: YES), the parallel-serial conversion device 14 performs parallel-serial conversion on the signals s1-1 to s1-M1, ..., sK-1 to sK-MK demodulated by the K demodulation devices 13-1 to 13-K, and outputs the result as demodulated data s1 to sM in a serial format (step S7). Whether there is further another signal to be demodulated is detected (step S8). If there is a signal to be demodulated (step S8: NO), the processing returns to the step S1 and repeats the same processing as described above. Otherwise, if there is no signal to be demodulated (step S8: YES), the processing is terminated.

In this manner, transmission signals 21-1 to 21-M transmitted simultaneously from M transmission antennae 21-1 to 21-M can be demodulated. Note that the present embodiment includes even a scheme that control is performed adaptively in correspondence with channel quality of transmitted signals, when determining a nulling matrix.

Second Embodiment

Next, the second embodiment of the present invention will be described in details with reference to the drawings.

Figure 3:
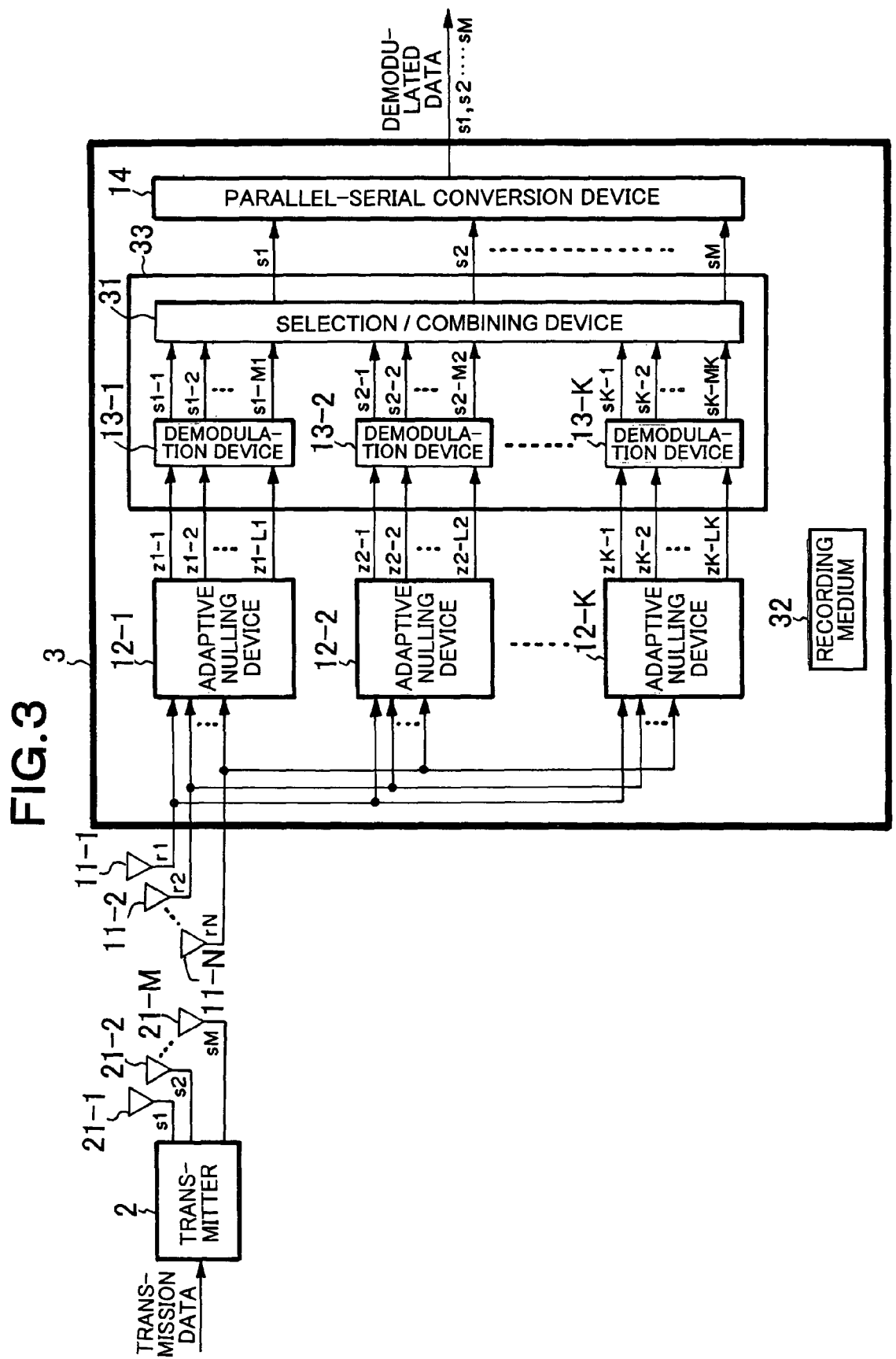
FIG. 3 is a block diagram showing the structure of a wireless communication system according to the second embodiment of the present invention.

FIG. 3 is a block diagram showing the structure of the present embodiment. The wireless communication system according to the present embodiment has the same structure as the first embodiment shown in FIG. 1 except that another receiver 3 is provided in place of the receiver 1.

Referring to FIG. 3, the receiver 3 according to the present embodiment receives transmission signals s1 to sM based on transmission data, which are transmitted through M transmission antennae 21-1 to 21-M from the transmitter 2, through N reception antennae 11-1 to 11-N. The receiver 3 demodulates and outputs the received signals r1 to rN. This receiver 3 has K adaptive nulling devices 12-1 to 12-K (K is an integer not smaller than 2 and not greater than M), an adaptive demodulation device 33, a parallel-serial conversion device 14, and a recording medium 32. The adaptive nulling devices 12-1 to 12-K are connected to the output sides of the N reception antennae 11-1 to 11-N, and perform nulling of respective received signals r1 to rN. The adaptive demodulation device 33 is connected to the output sides of the K adaptive nulling devices 12-1 to 12-K, and performs demodulation of signals. The parallel-serial conversion device 14 is connected to the output side of the adaptive demodulation device 33. The recording medium 32 is connected to a calculation device (not shown) in the receiver 3.

Of these components, the adaptive demodulation device 33 has K demodulation devices 13-1 to 13-K connected respectively to the output sides of the K adaptive nulling devices 12-1 to 12-K, and a selection/combining device 31 connected to the output sides of these demodulation devices 13-1 to 13-K. The structure of the adaptive demodulation device 33 is the same as that of the first embodiment except for the selection/combining device 31. Therefore, only the selection/combining device 31 will be described below.

The selection/combining device 31 performs both or one of selection and combining with respect to signals s1-1 to s1-M1, ..., sK-1 to sK-MK demodulated by the K demodulation devices 13-1 to 13-K, in correspondence with the channel quality of signals transmitted, and then outputs demodulated signals s1 to sM.

Figure 4:
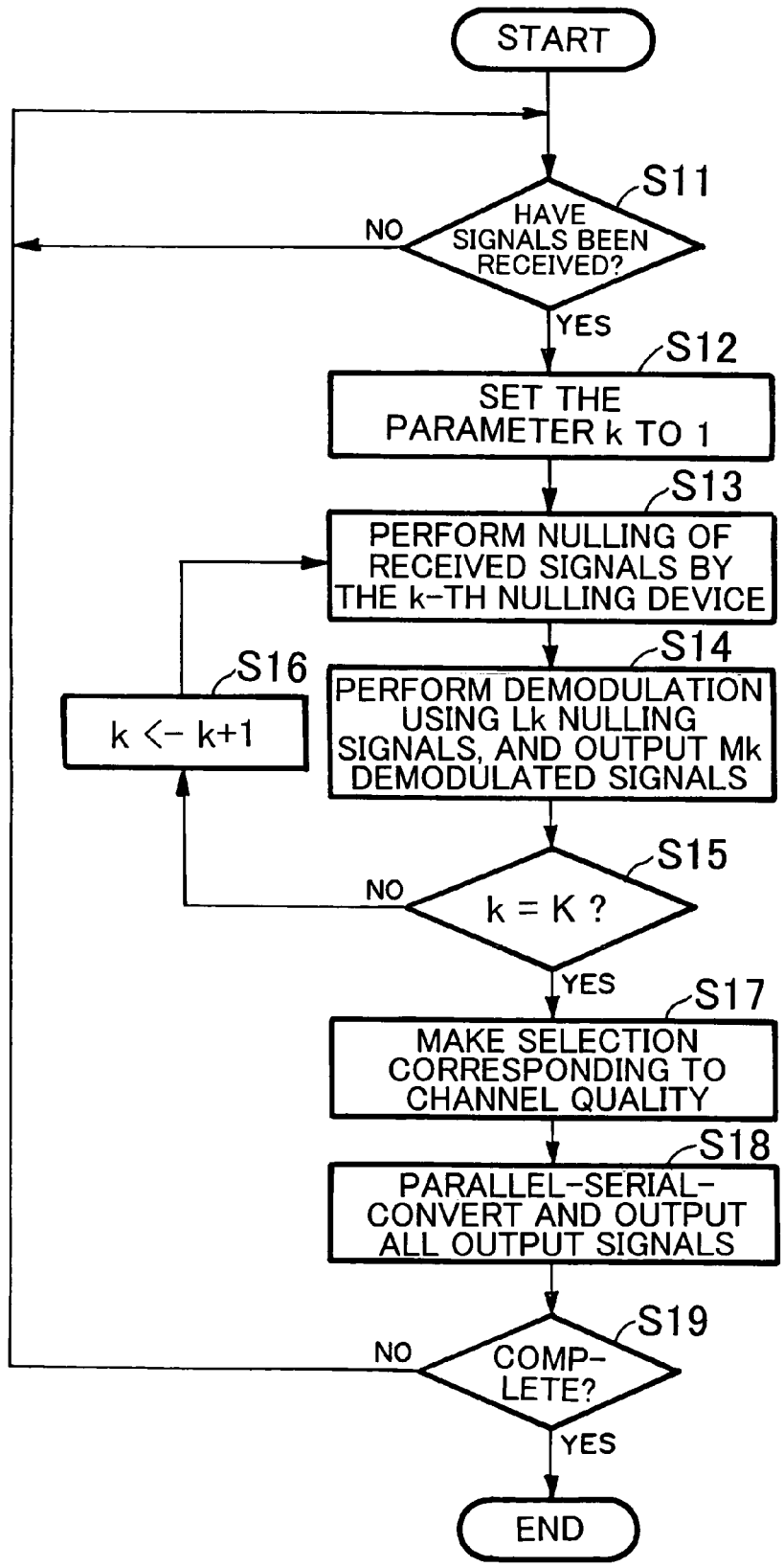
FIG. 4 is a flowchart showing a demodulation processing executed by a receiver shown in FIG. 3.

FIG. 4 is a flowchart showing operation of the present embodiment. The processing shown in FIG. 4 is realized as a calculation device (not shown) in the receiver 3 executes a program stored in the recording medium 32.

In FIG. 4, at first, the N reception antennae 11-1 to 11-N respectively receive signals (step S11: YES). Like in the first embodiment, the K adaptive nulling devices 12-1 to 12-K and the K demodulation devices 13-1 to 13-K demodulate the signals (steps S12, S13, S14, S15, and S16).

Next, the selection/combining device 31 performs both or one of selection and combining with respect to signals s1-1 to s1-M1, ..., sK-1 to sK-MK demodulated by the K demodulation devices 13-1 to 13-K, and outputs M demodulated signals s1 to sM (step S17). Next, the parallel-serial conversion device 14 performs parallel-serial conversion on the M demodulated signals s1 to sM, like in the first embodiment, and outputs these signals as demodulated data s1 to sM in a serial format (step S18). Further, whether there is any signal to be processed or not is checked (step S19). If there is a signal to be processed (step S19: NO), the processing returns to the step S21, and the same processing as described above is executed repeatedly. Otherwise, if there is no signal to be processed (step S19: YES), the processing is terminated.

Thus, in the present embodiment, improvements in reception performance can be expected by using the selection/combining device 31 to perform selection/combining with respect to overlapping demodulated signals.

Third Embodiment

Next, the third embodiment of the present invention will be described in details with reference to the drawings.

Figure 5:
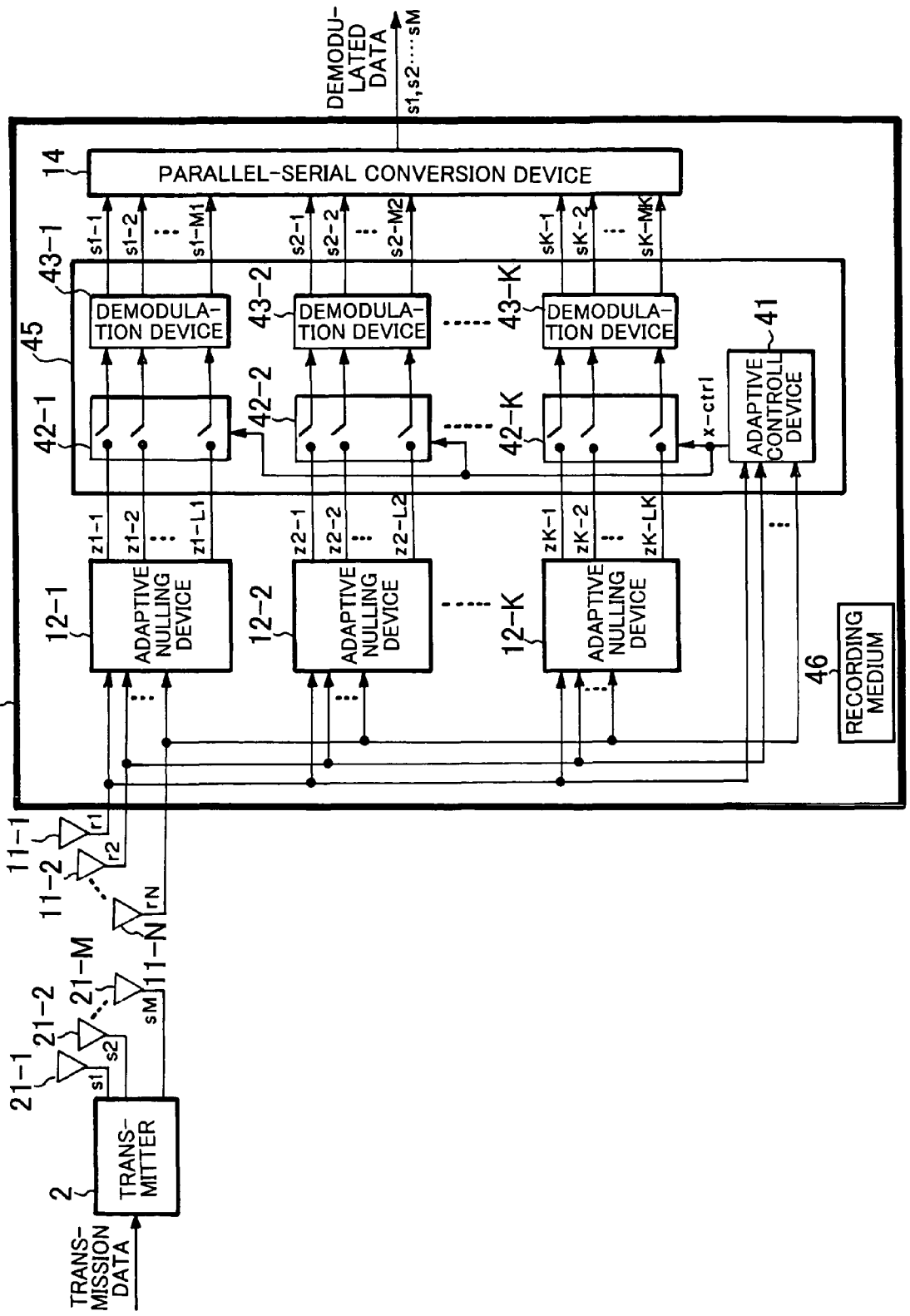
FIG. 5 is a block diagram showing the structure of a wireless communication system according to the third embodiment of the present invention.

FIG. 5 is a block diagram showing the structure of the present embodiment. The wireless communication system according to the present embodiment has the same structure as the first embodiment shown in FIG. 1 except that another receiver 4 is provided in place of the receiver 1.

Referring to FIG. 5, the receiver 4 according to the present embodiment receives transmission signals s1 to sM transmitted through M transmission antennae 21-1 to 21-M from the transmitter 2, through N reception antennae 11-1 to 11-N. The receiver 4 demodulates and outputs the received signals r1 to rN. This receiver 4 has K adaptive nulling devices 12-1 to 12-K, an adaptive demodulation device 45, a parallel-serial conversion device 14, and a recording medium 46. The adaptive nulling devices 12-1 to 12-K are connected to the output sides of the N reception antennae 11-1 to 11-N. The adaptive demodulation device 45 is connected to the output sides of the K adaptive nulling devices 12-1 to 12-K. The parallel-serial conversion device 14 is connected to the output side of the adaptive demodulation device 45. The recording medium 46 is connected to a calculation device (not shown) in the receiver 4.

The adaptive demodulation device 45 has an adaptive control device 41 connected to the output sides of the N reception antennae 11-1 to 11-N, K switches 42-1 to 42-K connected to the output sides of the K adaptive nulling devices 12-1 to 12-K and to the control signal output side of the adaptive control device 41, and K demodulation devices 43-1 to 43-K connected respectively to the output sides of the K switches 42-1 to 42-K. The structure of the adaptive demodulation device 45 is the same as that of the first embodiment except for the adaptive control device 41 and the K switches 42-1 to 42-K. Therefore, only the adaptive control device 41 and the K switches 42-1 to 42-K will be described below.

Based on the channel quality obtained from the received signals r1 to rN, the adaptive control device 41 determines the number of demodulation devices to be operated among the K demodulation devices 43-1 to 43-K, and outputs a control signal x-ctrl concerning this number.

If signals are demodulated by J demodulation devices 43-1 to 43-J (J is an integer not smaller than 1 and not greater than K), the switches 42-1 to 42-K are inputted with a control signal x-ctrl from the adaptive control device 41 and with nulling signals from the K adaptive nulling devices 12-1 to 12-K. Among these signals inputted, the nulling signals z1-1 to z1-L1, . . . , zJ-1 to zJ-LJ are outputted to the demodulation devices 43-1 to 43-J by the J switches 42-1 to 42-J. The other remaining switches 42-(J+1) to 42-K do not output anything. As a result, the J demodulation devices 43-1 to 43-J perform demodulation, and output demodulated signals s1-1 to s1-M1, . . . , sJ-1 to s1-MJ while the other remaining demodulation devices 43-(J+1) to 43-K do not operate.

Figure 6:
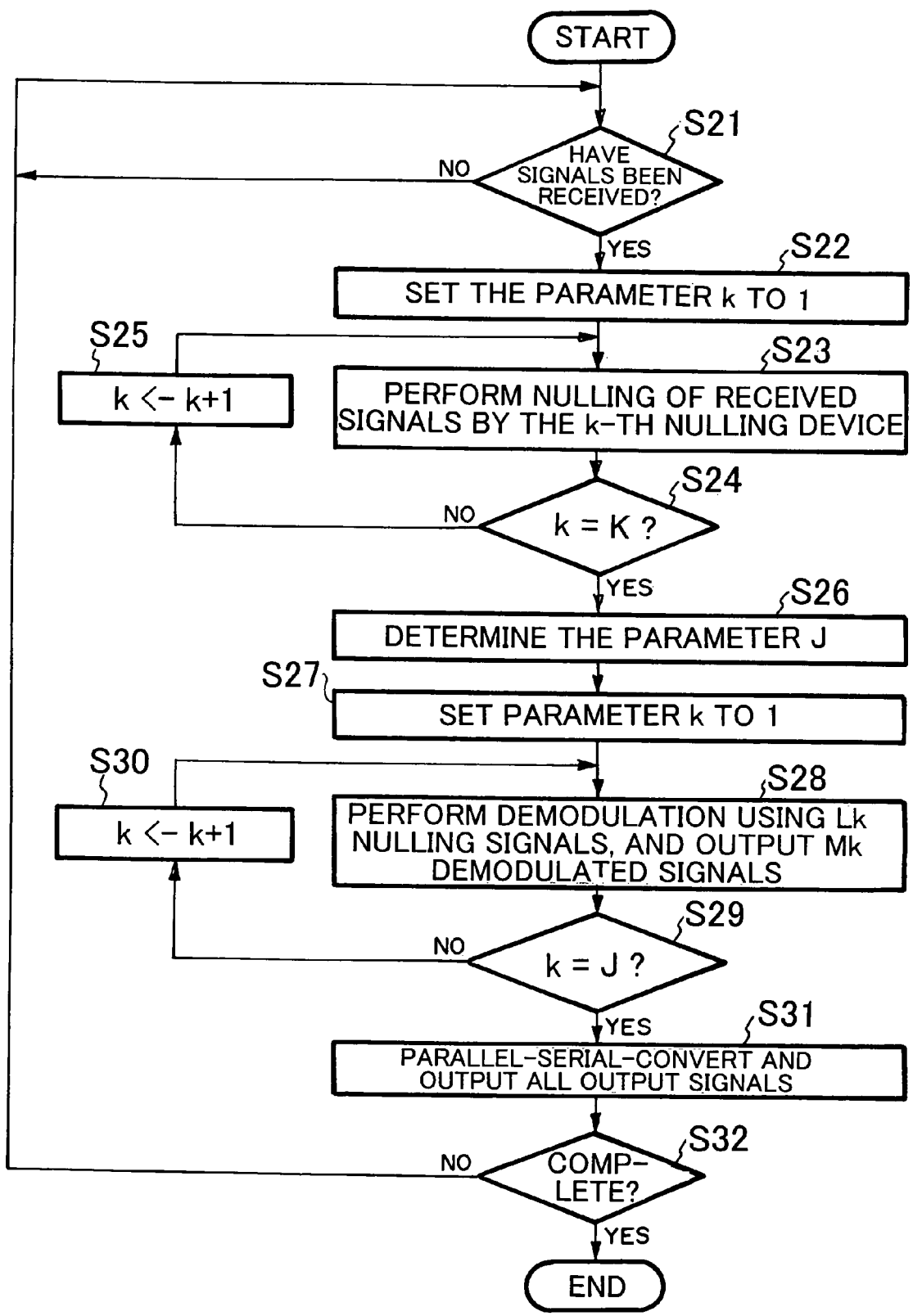
FIG. 6 is a flowchart showing a demodulation processing executed by a receiver shown in FIG. 5.

FIG. 6 is a flowchart showing operation of the present embodiment. The processing shown in FIG. 6 is realized as a calculation device (not shown) in the receiver 4 executes a program stored in the recording medium 46.

In FIG. 6, at first, the N reception antennae 11-1 to 11-N respectively receive signals (step S21: YES). Next, like in the first embodiment, the K adaptive nulling devices 12-1 to 12-K are used to perform nulling of the signals (steps S22, S23, S24, and S25). Next, the adaptive control device 41 determines, by any means, a parameter J indicative of the number of demodulation devices to be operated (step S26).

Next, the parameter k is set to 1 (step S27). The first demodulation device 43-1 among the K adaptive modulation devices 43-1 to 43-K performs demodulation and outputs demodulated signals s1-1 to s1-M1 (step S28). Whether the parameter k is equal to J or not is checked (step S29). If the parameter k is not equal to J (step S29: NO), the parameter k is incremented by one (step S30). The processing returns to the step S28 and repeats the same steps as described above.

Otherwise, if the parameter k is equal to J (step S29: YES), the signals s1-1 to s1-M1, . . . , sJ-1 to s1-MJ demodulated by the J demodulation devices 43-1 to 43-J are subjected to parallel-serial conversion, and outputted as demodulated data s1 to sM in a serial format (step S31). Whether there is further another signal to be demodulated is detected (step S32). If there is a signal to be demodulated (step S32: NO), the processing returns to the step S21 and repeats the same processing as described above. Otherwise, if there is no further signal to be demodulated (step S32: YES), the processing is terminated.

In this manner, transmission signals transmitted simultaneously from M transmission antennae 21-1 to 21-M can be demodulated efficiently, balancing quality and calculation in correspondence with states of channels.

Each of the embodiments 4 to 9 below supposes that: the transmitter has four transmission antennae; the receiver has four reception antennae; each transmission signal is a signal consisting of 16 values; and the demodulation processing is a maximum likelihood detection. This is an explanatory supposition and does not limit practice of the present invention.

Fourth Embodiment

Figure 7:
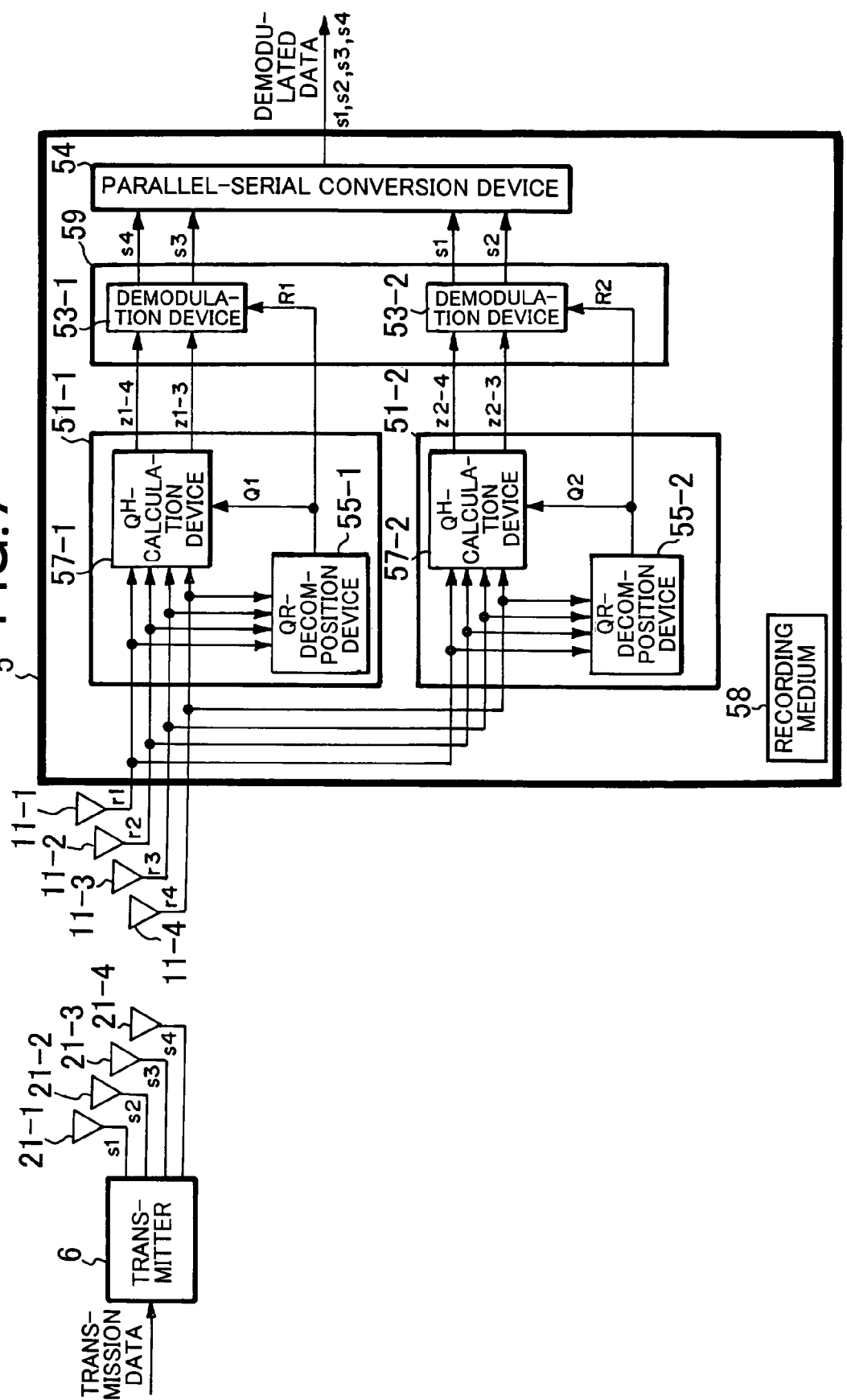
FIG. 7 is a block diagram showing the structure of a wireless communication system according to the fourth embodiment of the present invention.

FIG. 7 is a view showing the structure of a receiver according to the fourth embodiment of the present invention. A wireless communication system according to the present embodiment has the same structure as the wireless communication system according to the first embodiment.

Referring to FIG. 7, in the wireless communication system according to the present embodiment, a transmitter 6 has four transmission antennae 21-1 to 21-4 which respectively transmits signals s1, s2, s3, and s4. The receiver 5 has four reception antennae 11-1 to 11-4, and receives the signals s1 to s4 transmitted from the transmitter 6. Received signals r1 to r4 received by the receiver 5 can be expressed as follows in a matrix format, like in the related art.

$$r = \begin{pmatrix} r1 \\ r2 \\ r3 \\ r4 \end{pmatrix} = \begin{pmatrix} h11 & h12 & h13 & h14 \\ h21 & h22 & h23 & h24 \\ h31 & h32 & h33 & h34 \\ h41 & h42 & h43 & h44 \end{pmatrix} \begin{pmatrix} s1 \\ s2 \\ s3 \\ s4 \end{pmatrix} + \begin{pmatrix} n1 \\ n2 \\ n3 \\ n4 \end{pmatrix} = Hs + n \quad \text{[Formula 4]}$$

In this expression, r is a received-signal vector which is a vector having received signals r1 to r4 as elements, H is a channel matrix which is a matrix having channel coefficients h11 to h44 as elements, s is a transmission-signal vector which is a vector having transmission signals s1 to s4 as elements, and n is a noise vector which is a vector having, as elements, noises n1 to n4 added to received signals r1 to r4.

Referring to FIG. 7, the receiver 5 has two adaptive nulling devices 51-1 and 51-2, an adaptive demodulation device 59, a parallel-serial conversion device 54, and a recording medium 58. The adaptive nulling devices 51-1 and 51-2 are connected to the output sides of the four reception antenna 11-1 to 11-4. The adaptive demodulation device 59 is connected to the output sides of the adaptive nulling devices 51-1 and 51-2. The parallel-serial conversion device 54 is connected to the output side of the adaptive demodulation device 59. The recording medium 58 is connected to a calculation device (not shown) in the receiver 5 and stores a program to realize processing of respective sections in the receiver 5.

Of these components, the adaptive nulling device 51-1 has a QR-decomposition device 55-1 and a $Q^H$-calculation device 57-1 which are connected in parallel to the output sides of the respective reception antennae 11-1 to 11-4. Likewise, the adaptive nulling device 51-2 has a QR-decomposition device 55-2 and a $Q^H$-calculation device 57-2 which are connected in parallel to the output sides of the respective reception antennae 11-1 to 11-4. The adaptive demodulation device 59 has two demodulation devices 53-1 and 53-2 which are respectively connected to the output sides of the QR-decomposition device 55-1 and $Q^H$-calculation device 57-1, and the output sides of the QR-decomposition device 55-2 and $Q^H$-calculation device 57-2. That is, in the present embodiment, nulling using QR-decomposition is performed in the nulling processing.

The QR-decomposition device 55-1 performs QR-decomposition of the first channel matrix H1, and outputs a Q-matrix Q1 and a R-matrix R1. This can be expressed as H1=Q1R1. Suppose now that the first channel matrix H1 is equal to the channel matrix H described previously.

The $Q^H$-calculation device 57-1 is inputted with the Q-matrix Q1 and received signals r1 to r4. The received-signal vector r is multiplied by the complex conjugate transposition of the Q-matrix Q1 from the left side, to achieve orthogonalization, and outputs the result as nulling signals z1-1 to z1-4. Since the Q-matrix Q1 satisfies $Q1^H Q1 = I$ (I is a unit matrix), a nulling signal vector z1 having orthogonalized nulling signals z1-1 to z1-4 as elements can be expressed as $z1 = Q1^H r = R1s + Q^H n$. At this time, paying attention to that the R-matrix R1 is an upper triangular matrix, the formula 4 described above can be written as follows.

$$\begin{pmatrix} z1-1 \\ z1-2 \\ z1-3 \\ z1-4 \end{pmatrix} = \begin{pmatrix} r1-11 & r1-12 & r1-13 & r1-14 \\ 0 & r1-22 & r1-23 & r1-24 \\ 0 & 0 & r1-33 & r1-34 \\ 0 & 0 & 0 & r1-44 \end{pmatrix} \begin{pmatrix} s1 \\ s2 \\ s3 \\ s4 \end{pmatrix} + \begin{pmatrix} n1-1 \\ n1-2 \\ n1-3 \\ n1-4 \end{pmatrix}$$
[Formula 5]

The $Q^H$-calculation device 57-1 outputs two nulling signals z1-3 and z1-4 among these elements.

The demodulation device 53-1 is inputted with two nulling signals z1-3 and z1-4 from the $Q^H$-calculation device 57-1 and with the R-matrix R1 from the QR-decomposition device 55-1, and performs demodulation of signals. More specifically, replicas of nulling signals z1-3 and z1-4 are calculated from the R1 matrix and signal candidates of transmission signals. Errors between the replicas and the nulling signals z1-3 and z1-4 are calculated, and those signal candidates of the transmission signals that give the smallest error are outputted as demodulated signals s3 and s4. At this time, the two nulling signals z1-3 and z1-4 inputted to the demodulation device 53-1 can be expressed as follows.

$$\begin{pmatrix} z1-3 \\ z1-4 \end{pmatrix} = \begin{pmatrix} r1-33 & r1-34 \\ 0 & r1-44 \end{pmatrix} \begin{pmatrix} s3 \\ s4 \end{pmatrix} + \begin{pmatrix} n1-3 \\ n1-4 \end{pmatrix}$$
[Formula 6]

Replicas of the nulling signal z1-4 are calculated as z1-4-1=r1-44c1, z1-4-2=r1-44c2, ..., z1-4-16=r1-44c16. Replicas of the nulling signal z1-3 are calculated as z1-3-1=r1-33c1+r1-34c1, z1-3-2=r1-33c1+r1-34c2, ..., r1-3-256=r1-33c16+r1-34c16. Errors between each of the calculated replica signals z1-4-1 to z1-4-16 and z1-3-1 to r1-3-256 and the two nulling signals z1-4 and z1-3 are calculated. Candidates for transmission signals that give the smallest errors are taken as s3 and s4. Therefore, the number of replicas calculated by the demodulation device 53-1 is 272.

On the other side, the QR-decomposition device 55-2 performs QR-decomposition with respect to the second channel matrix H2. Where the second channel matrix H2 is a matrix in which the first and second columns are rearranged to be replaced with the third and fourth columns of the channel matrix H described above, the second channel matrix H2 can be expressed as follows.

$$H2 = \begin{pmatrix} h13 & h14 & h11 & h12 \\ h23 & h24 & h21 & h22 \\ h33 & h34 & h31 & h32 \\ h43 & h44 & h41 & h42 \end{pmatrix}$$
[Formula 7]

The QR-decomposition device 55-2 QR-decomposes the second channel matrix H2, and outputs a Q-matrix Q2 and a R-matrix R2. This can be written as H2=Q2R2.

The $Q^H$-calculation device 57-2 is inputted with the Q-matrix Q2 and the received signals r1 to r4, and multiplies the received-signal vector by the complex conjugate transposition of the Q-matrix Q2 from the left side, to achieve orthogonalization. The $Q^H$-calculation device 57-2 outputs the result as nulling signals z2-1 to z2-4. Since the Q-matrix Q2 satisfies $Q2^H Q2 = I$ (I is a unit matrix), the nulling signal vector z2 having the orthogonalized nulling signals z2-1 to z2-4 as elements can be written as $z2 = Q2^H r = R2s + Q2^H n$. At this time, paying attention to that R2 is an upper triangular matrix, the formula 7 described above can be written as follows.

$$\begin{pmatrix} z2-1 \\ z2-2 \\ z2-3 \\ z2-4 \end{pmatrix} = \begin{pmatrix} r2-11 & r2-12 & r2-13 & r2-14 \\ 0 & r2-22 & r2-23 & r2-24 \\ 0 & 0 & r2-33 & r2-34 \\ 0 & 0 & 0 & r2-44 \end{pmatrix} \begin{pmatrix} s3 \\ s4 \\ s1 \\ s2 \end{pmatrix} + \begin{pmatrix} n2-1 \\ n2-2 \\ n2-3 \\ n2-4 \end{pmatrix}$$
[Formula 8]

The $Q^H$-calculation device 57-2 outputs two nulling signals z2-3 and z2-4 of these elements.

The demodulation device 53-2 is inputted with the two nulling signals z2-3 and z2-4 from the $Q^H$-calculation device 57-2, and the R-matrix R2 from the QR-decomposition device 55-2, performs demodulation of signals, and outputs demodulated signals s1 and s2. At this time, the two nulling signals z2-3 and z2-4 inputted to the demodulation device 53-2 can be written as follows.

$$\begin{pmatrix} z2-3 \\ z2-4 \end{pmatrix} = \begin{pmatrix} r2-33 & r2-34 \\ 0 & r2-44 \end{pmatrix} \begin{pmatrix} s1 \\ s2 \end{pmatrix} + \begin{pmatrix} n2-3 \\ n2-4 \end{pmatrix}$$ [Formula 9]

Demodulation is carried out by the same means as the demodulation device 53-1, and therefore, the number of replica signals necessary to obtain demodulated signals s1 and s2 is 272.

The parallel-serial conversion device 54 is inputted with demodulated signals s1 to s4, performs parallel-serial conversion, and outputs demodulated data s1 to s4 in a serial format.

Figure 8:
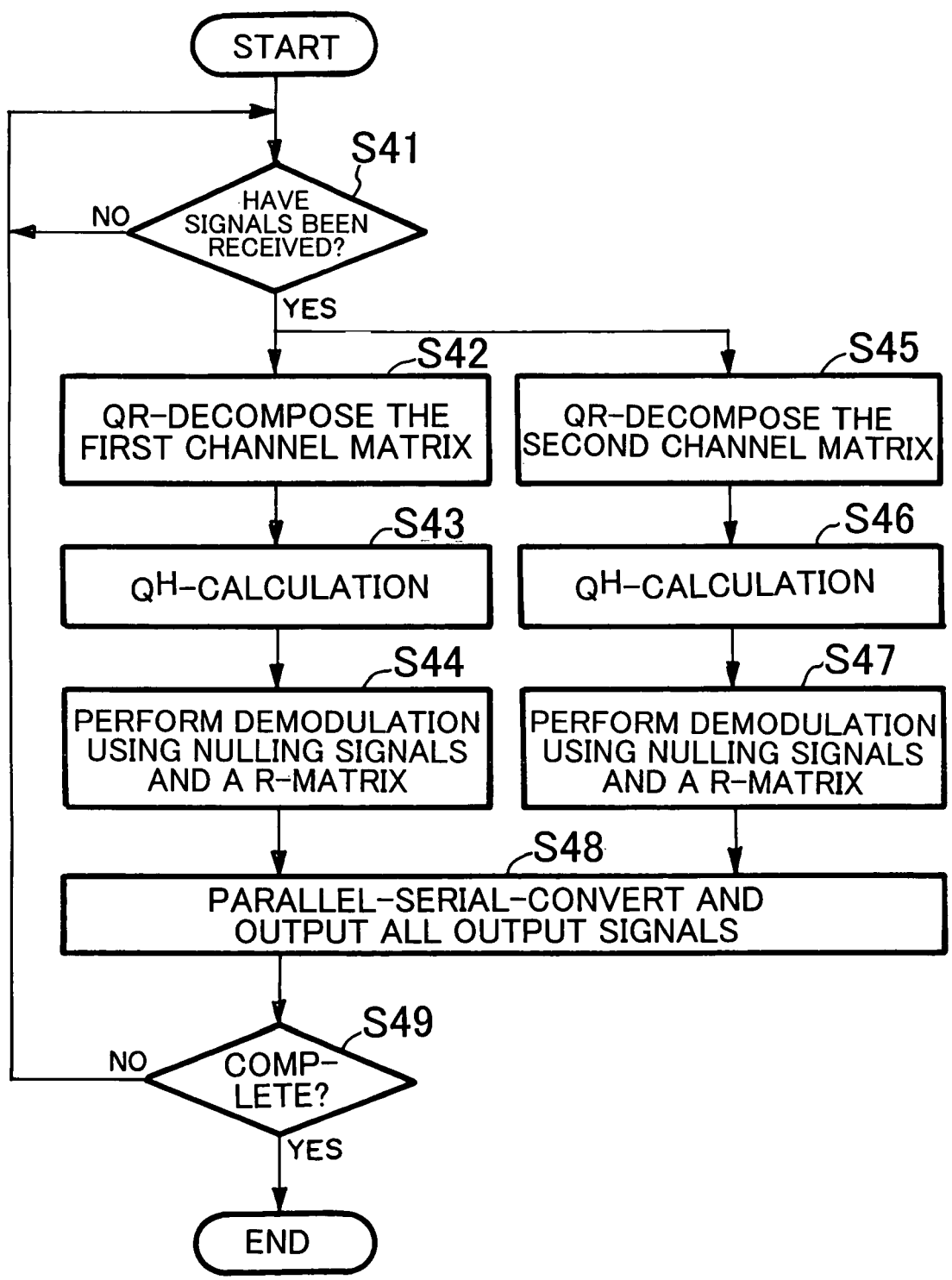
FIG. 8 is a flowchart showing a demodulation processing executed by a receiver shown in FIG. 7.

FIG. 8 is a flowchart showing demodulation processing of the receiver 5. Referring to FIGS. 7 and 8, the demodulation processing of the receiver 5 according to the present embodiment will be described. Note that the processing shown in FIG. 8 is realized as a calculation device (not shown) in the receiver 5 executes a program stored in the recording medium 58.

In FIG. 8, at first, the 4 reception antennae 11-1 to 11-4 respectively receive signals (step S41: YES). Then, the QR-decomposition device 55-1 performs QR-decomposition of the first channel matrix H1 (step S42). The $Q^H$-calculation device 57-1 multiplies the received signals vector r by the complex conjugate transposition of the Q-matrix Q1 from the left side, thereby to achieve orthogonalization, and outputs two nulling signals z1-3 and z1-4 (step S43). The demodulation device 53-1 is inputted with the two nulling signals z1-3 and z1-4 and with the R-matrix R1 from the QR-decomposition device 55-1, performs demodulation of signals, and outputs two demodulated signals s3 and s4 (step S44).

On the other side, in parallel with the processing in the steps S42 to S44, the QR-decomposition device 55-2 performs QR-decomposition of the second channel matrix H2 (step S45), and the $Q^H$-calculation device 57-2 multiplies the received-signal vector r by the complex conjugate transposition of the Q-matrix Q2 from the left side, to achieve orthogonalization, and outputs two nulling signals z2-3 and z2-4 (step S46). The demodulation device 53-2 is inputted with the two nulling signals z2-3 and z2-4 from the $Q^H$-calculation device 57-2 and with the R-matrix R2 from the QR-decomposition device 55-2, performs demodulation of signals, and outputs two demodulated signals s1 and s2 (step S47).

Next, the parallel-serial conversion device 54 performs parallel-serial conversion of four demodulated signals s1 to s4, and outputs demodulated data s1 to s4 in a serial format (step S48). Next, whether or not there is any other signal received is detected (step S49). If there is any other received signal (step S49: NO), the processing returns to the step S41 and performs the same processing as described above. Otherwise, if there is no other signal received (step S49: YES), the processing is terminated.

Therefore, in the present embodiment, the total number of replicas necessary for the demodulation devices 53-1 and 53-2 is 544 and thus reduced to be small compared with the total number 784 of replicas necessary for the related art. As has been described in the present embodiment, the present invention does not require a selection processing. Further, in the demodulation devices 53-1 and 53-2, all combinations of signals s3 and s4 or signals s1 and s2 are used to determine demodulated signals. Therefore, even when bit likelihood is required, there is no case that calculations are impossible.

Fifth Embodiment

Figure 9:
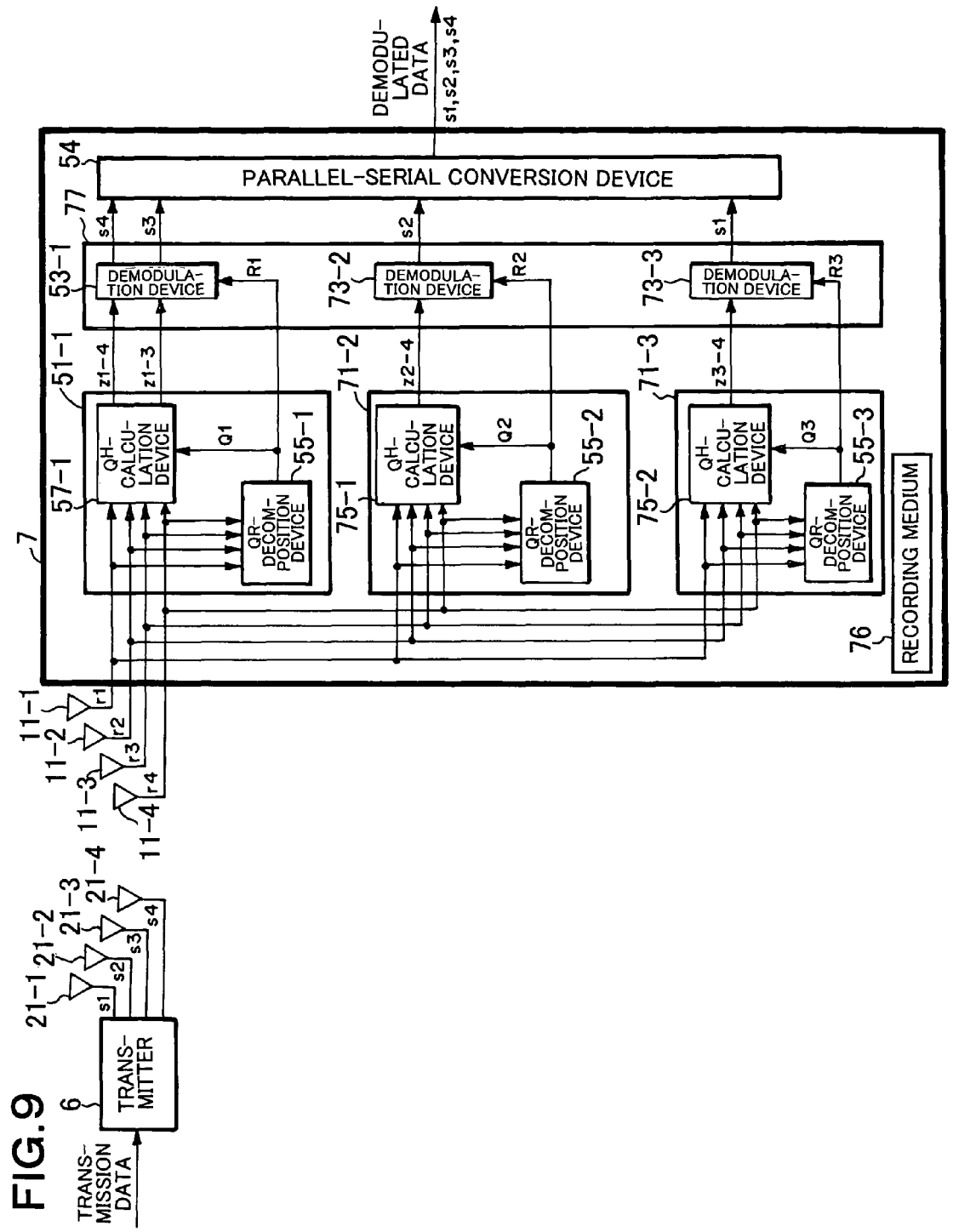
FIG. 9 is a block diagram showing the structure of a wireless communication system according to the fifth embodiment of the present invention.

FIG. 9 is a block diagram showing the structure of a receiver according to the fifth embodiment of the present invention. The structure of the wireless communication system in the present embodiment is the same as that of the first embodiment shown in FIG. 1 except that the receiver 7 is provided in place of the receiver 1.

Referring to FIG. 9, like the receiver 5 in the fourth embodiment, the receiver 7 according to the present embodiment has four reception antennae 11-1 to 11-4, and receives signals s1 to s4 transmitted from the transmitter 6 through four transmission antennae 21-1 to 21-4. The receiver 7 demodulates and outputs received signals r1 to r4 received. At this time, the received signals r1 to r4 received by the receiver 7 and the transmission signals s1 to s4 are related to each other as follows, like in the fourth embodiment.

$$\begin{pmatrix} r1 \\ r2 \\ r3 \\ r4 \end{pmatrix} = \begin{pmatrix} h11 & h12 & h13 & h14 \\ h21 & h22 & h23 & h24 \\ h31 & h32 & h33 & h34 \\ h41 & h42 & h43 & h44 \end{pmatrix} \begin{pmatrix} s1 \\ s2 \\ s3 \\ s4 \end{pmatrix} + \begin{pmatrix} n1 \\ n2 \\ n3 \\ n4 \end{pmatrix}$$ [Formula 10]

This can be expressed as r=Hs+n.

Referring to FIG. 9, the receiver 7 has three adaptive nulling devices 51-1, 71-2, and 71-3, an adaptive demodulation device 77, a parallel-serial conversion device 54, and a recording medium 76. The adaptive nulling devices 51-1, 71-2, and 71-3 are connected to the output sides of the four reception antennae 11-1 to 11-4. The adaptive demodulation device 77 has three demodulation devices 53-1, 73-2, and 73-3 connected to the output sides of the adaptive nulling devices 51-1, 71-2, and 71-3. The parallel-serial conversion device 54 is connected to the output sides of the demodulation devices 53-1, 73-2, and 73-3. The recording medium 76 is connected to a calculation device (not shown) in the receiver 7 and stores a program to realize processing of respective sections in the receiver 7.

Of these components, the adaptive nulling device 71-2 has a QR-decomposition device 55-2 and a $Q^H$-calculation device 75-1 which are connected in parallel to the output sides of the respective reception antennae 11-1 to 11-4. Likewise, the adaptive nulling device 71-3 has a QR-decomposition device 55-3 and a $Q^H$-calculation device 75-2 which are connected in parallel to the output sides of the respective reception antennae 11-1 to 11-4. Operations of the adaptive nulling device 51-1 and the demodulation device 53-1 are the same as those in the fourth embodiment. Therefore, a description thereof will be omitted herefrom.

In the nulling device 71-2, the QR-decomposition device 55-2 performs QR-decomposition with use of the second channel matrix H2, and outputs a Q-matrix Q2 and a R-matrix R2, like in the fourth embodiment.

The $Q^H$-calculation device 75-1 performs nulling with use of the Q-matrix Q2, like in the fourth embodiment. However, the $Q^H$-calculation device 75-1 outputs only the nulling signal z2-4.

The demodulation device 73-2 performs demodulation of signals from the nulling signal z2-4 and the R-matrix R2, and outputs a demodulated signal s2. Since z2-4=r2-44s2+n2-4 exists, the number of replicas required by the demodulation device 73-2 is 16.

In the nulling device 71-3, the QR-decomposition device 55-3 performs QR-decomposition with respect to the third channel matrix, and outputs a Q-matrix Q3 and a R-matrix R3. Suppose now that the third channel matrix is rearranged as follows, using elements of the channel matrix.

$$H3 = \begin{pmatrix} h13 & h14 & h12 & h11 \\ h23 & h24 & h22 & h21 \\ h33 & h34 & h32 & h31 \\ h43 & h44 & h42 & h41 \end{pmatrix} \quad \text{[Formula 11]}$$

The $Q^H$-calculation device 75-2 performs nulling of received signals, like the nulling device 71-2, and outputs a nulling signal z3-4. The demodulation device 73-3 performs demodulation of signals from the nulling signal z3-4 and the R-matrix R3, and outputs a demodulated signal s1. Since z3-4=r3-44s1+n3-4 exists, the number of replicas required by the demodulation device 73-3 is 16, like in the demodulation device 73-2.

The parallel-serial conversion device 54 is inputted with demodulated signals s1 to s4, performs parallel-serial conversion, and outputs demodulated signals.

Figure 10:
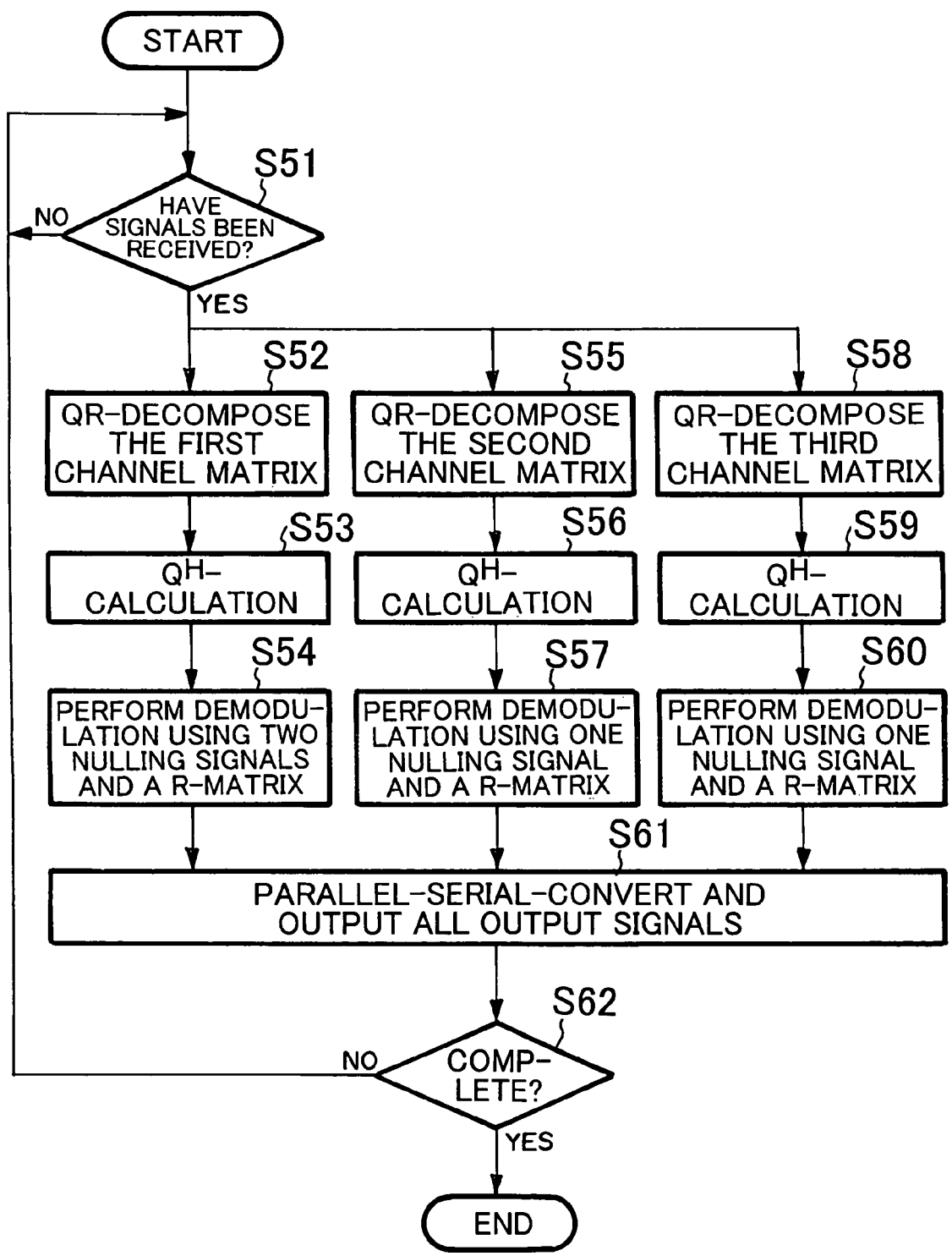
FIG. 10 is a flowchart showing a demodulation processing executed by a receiver shown in FIG. 9.

FIG. 10 is a flowchart showing demodulation processing of the receiver 7. Referring to FIGS. 9 and 10, the demodulation processing of the receiver 7 according to the present embodiment will now be described. Note that the processing shown in FIG. 10 is realized as a calculation device (not shown) in the receiver 7 executes a program stored in the recording medium 76.

In FIG. 10, at first, the reception antennae 11-1 to 11-4 respectively receive signals (step S51: YES). Then, the QR-decomposition device 55-1 performs QR-decomposition of the first channel matrix (step S52). The $Q^H$-calculation device 57-1 multiplies the received-signal vector by the complex conjugate transposition of the Q-matrix Q1 from the left side, thereby to achieve orthogonalization (step S53). The demodulation device 53-1 is inputted with two nulling signals and with the R-matrix R1, performs demodulation of signals, and outputs two demodulated signals s3 and s4 (step S54).

Next, the QR-decomposition device 55-2 performs QR-decomposition of the second channel matrix (step S55), and the $Q^H$-calculation device 75-1 multiplies the received-signal vector by the complex conjugate transposition of the Q-matrix Q2 from the left side, to achieve orthogonalization (step S56). The demodulation device 73-2 is inputted with one nulling signal and with the R-matrix R2, performs demodulation of signals, and outputs one demodulated signal s2 (step S57).

Next, the QR-decomposition device 55-3 performs QR-decomposition of the third channel matrix (step S58), and the $Q^H$-calculation device 75-2 multiplies the received-signal vector by the complex conjugate transposition of the Q-matrix Q3 from the left side, to achieve orthogonalization (step S59). The demodulation device 73-3 is inputted with one nulling signal and with the R-matrix R3, performs demodulation of signals, and outputs one demodulated signal s1 (step S60).

Next, the parallel-serial conversion device 54 performs parallel-serial conversion of four demodulated signals s1 to s4, and outputs the result as demodulated data s1 to s4 in a serial format (step S61). Next, whether or not there is any other signal received is detected (step S62). If there is any other received signal (step S62: NO), the processing returns to the step S51 and performs the same processing as described above. Otherwise, if there is no other signal received (step S62: YES), the processing is terminated.

Therefore, the numbers of replicas necessary for the three demodulation devices 53-1, 73-2, and 73-3 are respectively 272, 16, and 16. That is, total 304 replicas are calculated. Thus, according to the present embodiment, the number of replicas can be reduced greatly, compared with 784 which is the number of replicas necessary for the related art. In addition, it is unnecessary to select transmission signal candidates. As a result, even when bit likelihood is required, there is no case that the bit likelihood cannot be calculated.

Sixth Embodiment

Figure 11:
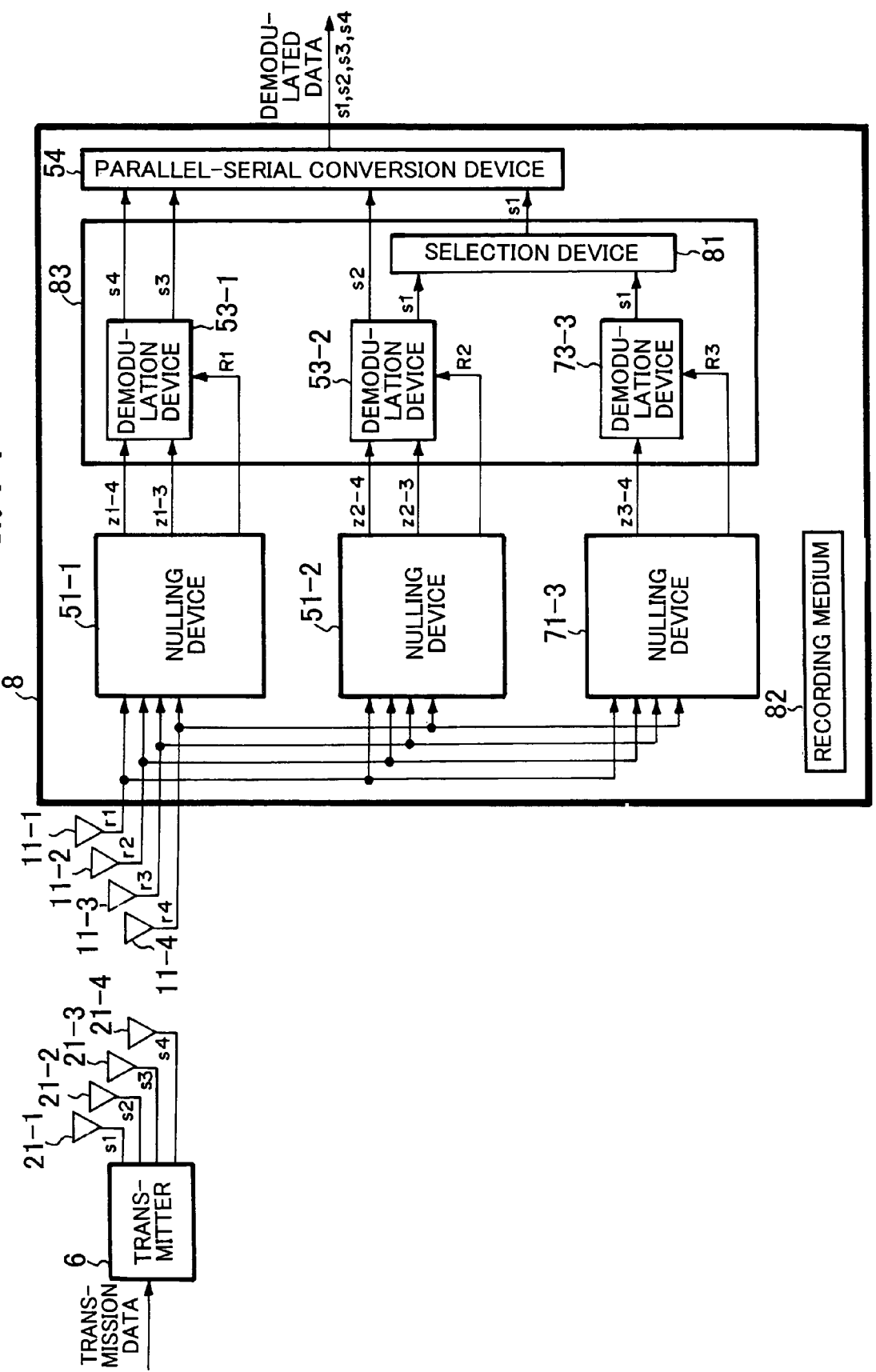
FIG. 11 is a block diagram showing the structure of a wireless communication system according to the sixth embodiment of the present invention.

FIG. 11 is a block diagram showing the structure of a receiver according to the sixth embodiment of the present invention.

Referring to FIG. 11, the receiver 8 according to the present embodiment receives, through four reception antennae 11-1 to 11-4, signals s1 to s4 transmitted from the transmitter 6 through four transmission antennae 21-1 to 21-4. The receiver 8 demodulates and outputs signals r1 to r4 received. The receiver 8 has three adaptive nulling devices 51-1, 71-2, and 71-3, an adaptive demodulation device 83, a parallel-serial conversion device 54, and a recording medium 82. The adaptive nulling devices 51-1, 71-2, and 71-3 are connected to the output sides of the four reception antennae 11-1 to 11-4. The adaptive demodulation device 83 is connected to the output sides of the adaptive nulling devices 51-1, 71-2, and 71-3. The parallel-serial conversion device 54 is connected to the output side of the adaptive demodulation device 83. The recording medium 76 is connected to a calculation device (not shown) in the receiver 8 and stores a program to realize processing of respective sections in the receiver 8.

Of these components, the adaptive nulling device 83 has three demodulation devices 53-1, 53-2, and 73-3 connected respectively to the output sides of the three nulling devices 51-1, 71-2, and 71-3, and a selection device 81 connected to the output sides of two demodulation devices 53-2 and 73-3 among the three demodulation devices.

Figure 12:
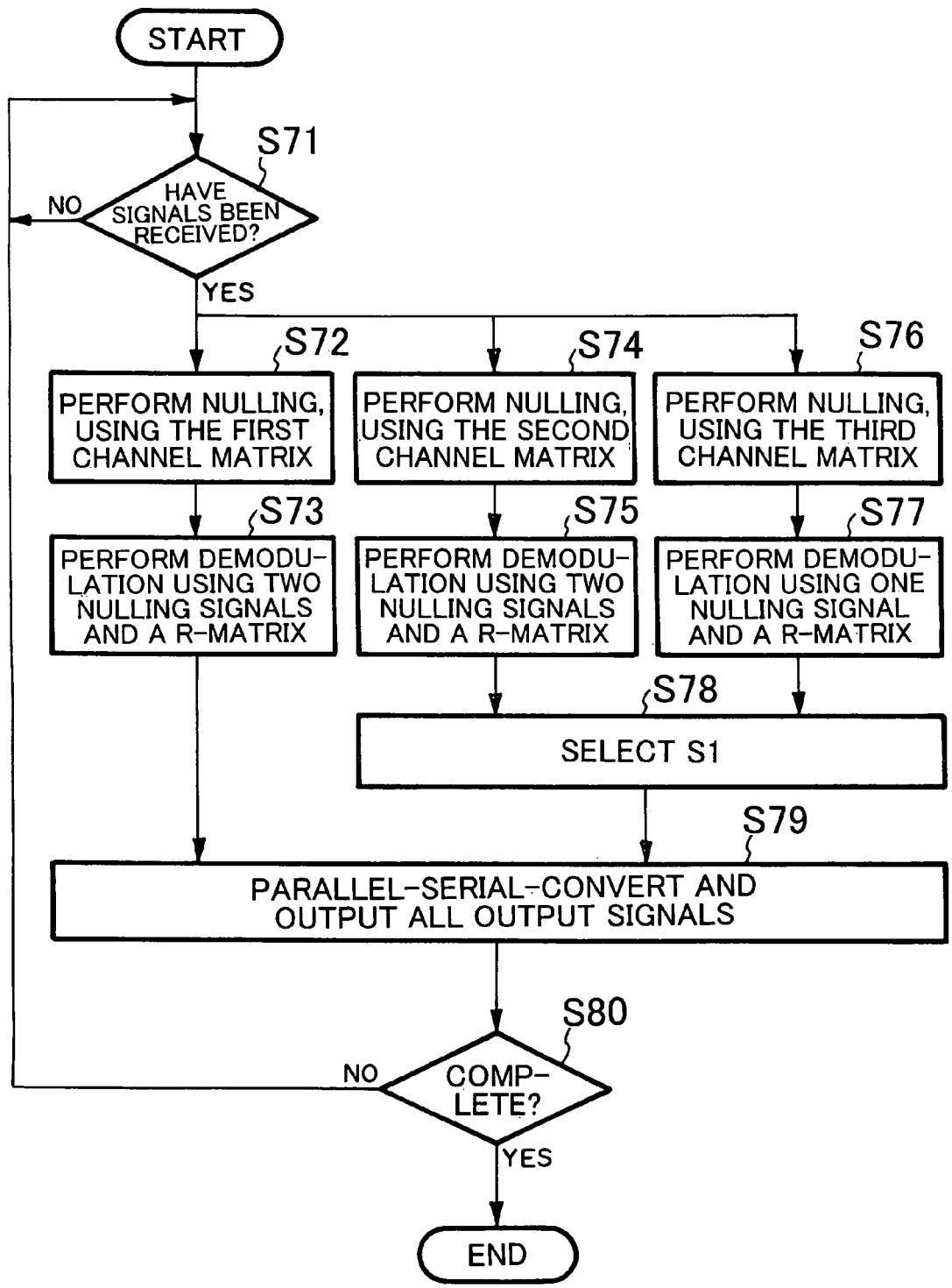
FIG. 12 is a flowchart showing a demodulation processing executed by a receiver shown in FIG. 11.

FIG. 12 is a flowchart showing demodulation processing of the receiver 8. Referring to FIGS. 11 and 12, the demodulation processing of the receiver 8 according to the present embodiment will now be described. Note that the processing shown in FIG. 12 is realized as a calculation device (not shown) in the receiver 8 executes a program stored in the recording medium 82.

In FIG. 12, at first, four reception antennae 11-1 to 11-4 respectively receive signals (step S71). The adaptive nulling device 51-1 performs nulling with use of the first channel matrix, like in the fourth embodiment, and outputs two nulling signals z1-4 and z1-3 (step S72). Next, the demodulation device 53-1 performs demodulation with use of the two nulling signals z1-4 and z1-3 and the R-matrix R1, and outputs two demodulated signals s4 and s3 (step S73).

Next, the adaptive nulling device 51-2 performs nulling with use of the second channel matrix, like in the fourth embodiment, and outputs two nulling signals z2-4 and z2-3 (step S74). Next, the demodulation device 53-2 performs demodulation with use of the two nulling signals z2-4 and z2-3 and the R-matrix R2, and outputs two demodulated signals s1 and s2 (step S75).

Next, the adaptive nulling device 71-3 performs nulling with use of the third channel matrix, like in the fifth embodiment, and outputs one nulling signal z3-4 (step S76). Next, the demodulation device 73-3 performs demodulation with use of the one nulling signal z3-4 and the R-matrix R3, and outputs one demodulated signal s1 (step S77).

Next, the selection device 81 selects such one of the signals s1 demodulated by the demoualtion devices 53-2 and 73-3 that has a greater reception SINR (Signal to Interference-plus-Noise Ratio), and outputs the selected signal s1 (step S78).

Next, the parallel-serial conversion device 54 performs parallel-serial conversion of four demodulated signals s1 to s4, and outputs the result as demodulated data s1 to s4 in a serial format (step S79). Next, whether or not there is any other signal received is detected (step S80). If there is any other received signal (step S80: NO), the processing returns to the step S71 and performs the same processing as described above. Otherwise, if there is no other signal received (step S80: YES), the processing is terminated.

Therefore, by adopting the structure and scheme of the present embodiment, more excellent one of two demodulated signals can be selected particularly for the signal s1, and therefore, improvements in transmission characteristics are expected.

In the present embodiment, the selection device 81 performs selection of one signal. This is merely one example, and the number of signals to be selected is not particularly limited. Although a device to select a signal is provided in the present embodiment, a device which can perform combining or both of selection and combining may be provided, depending on the structure of the receiver. Further, according to the present embodiment, the SINR is used as a reference for selection. This is also merely an explanatory example and does not restrict the reference for selection.

Seventh Embodiment

Figure 13:
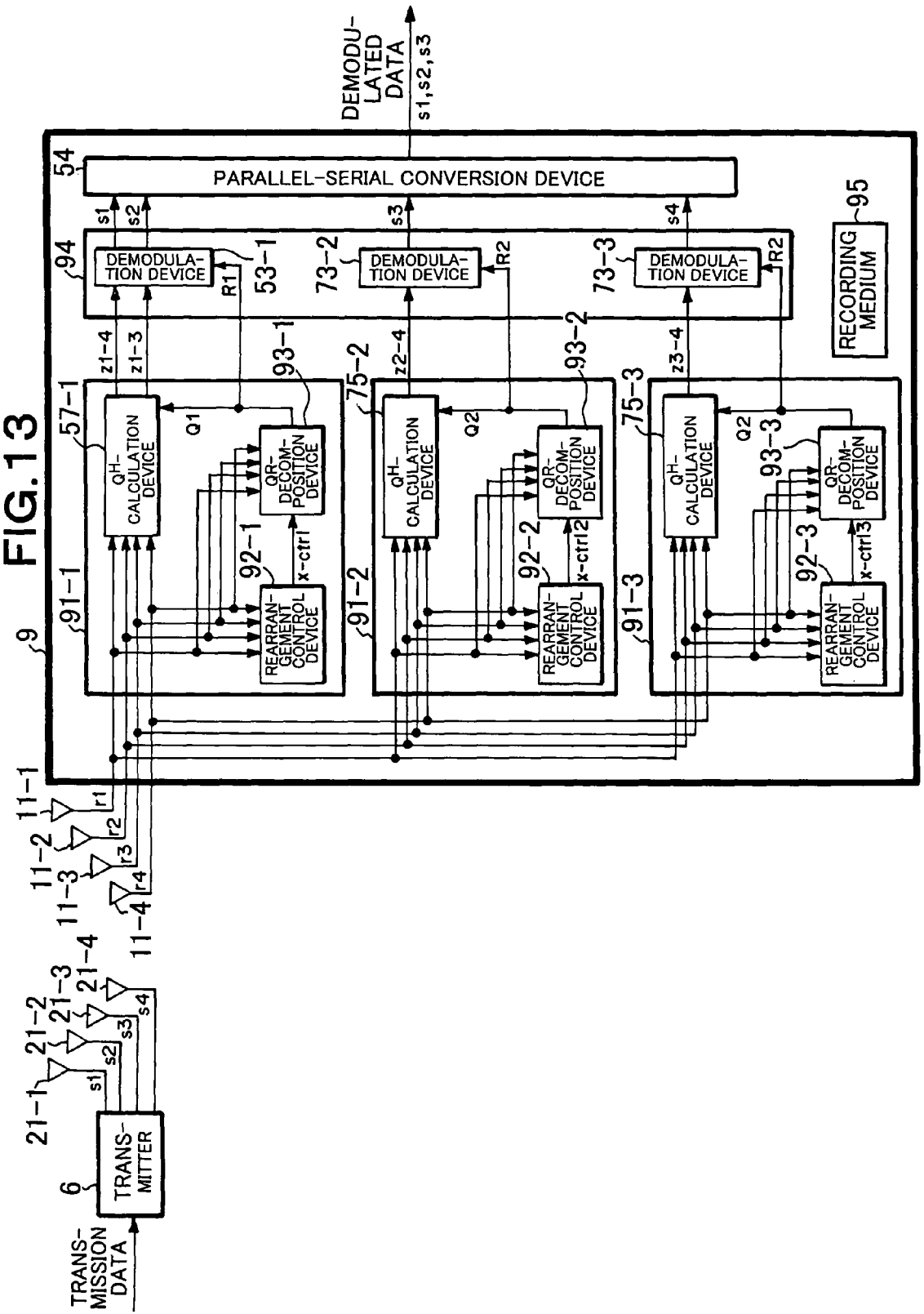
FIG. 13 is a block diagram showing the structure of a wireless communication system according to the seventh embodiment of the present invention.

FIG. 13 is a block diagram showing the structure of a receiver according to the seventh embodiment of the present invention.

Referring to FIG. 13, the receiver 9 according to the present embodiment receives, through four reception antennae 11-1 to 11-4, signals s1 to s4 transmitted from the transmitter 6 through four transmission antennae 21-1 to 21-4. The receiver 9 demodulates and outputs signals r1 to r4 received. The receiver 9 has three adaptive nulling devices 91-1, 91-2, and 91-3, an adaptive demodulation device 94, a parallel-serial conversion device 54, and a recording medium 95. The adaptive nulling devices 91-1, 91-2, and 91-3 are connected to the output sides of the four reception antennae 11-1 to 11-4. The adaptive demodulation device 94 has three demodulation devices 53-1, 73-2 and 73-3 respectively connected to the output sides of the adaptive nulling devices 91-1, 91-2, and 91-3. The parallel-serial conversion device 54 is connected to the output side of the adaptive demodulation device 94. The recording medium 95 stores a program to realize processings of respective sections in the receiver 9.

The adaptive nulling device 91-1 has a rearrangement control device 92-1, a QR-decomposition device 93-1, and a $Q^H$-calculation device 57-1 which are connected in parallel with the output sides of the reception antennae 11-1 to 11-4. Likewise, the adaptive nulling device 91-2 has a rearrangement control device 92-2, a QR-decomposition device 93-2, and a $Q^H$-calculation device 75-2 which are connected in parallel with the output sides of the reception antennae 11-1 to 11-4. The adaptive nulling device 91-3 has a rearrangement control device 92-3, a QR-decomposition device 93-3, and a $Q^H$-calculation device 75-3 which are connected in parallel with the output sides of the reception antennae 11-1 to 11-4.

Figure 14:
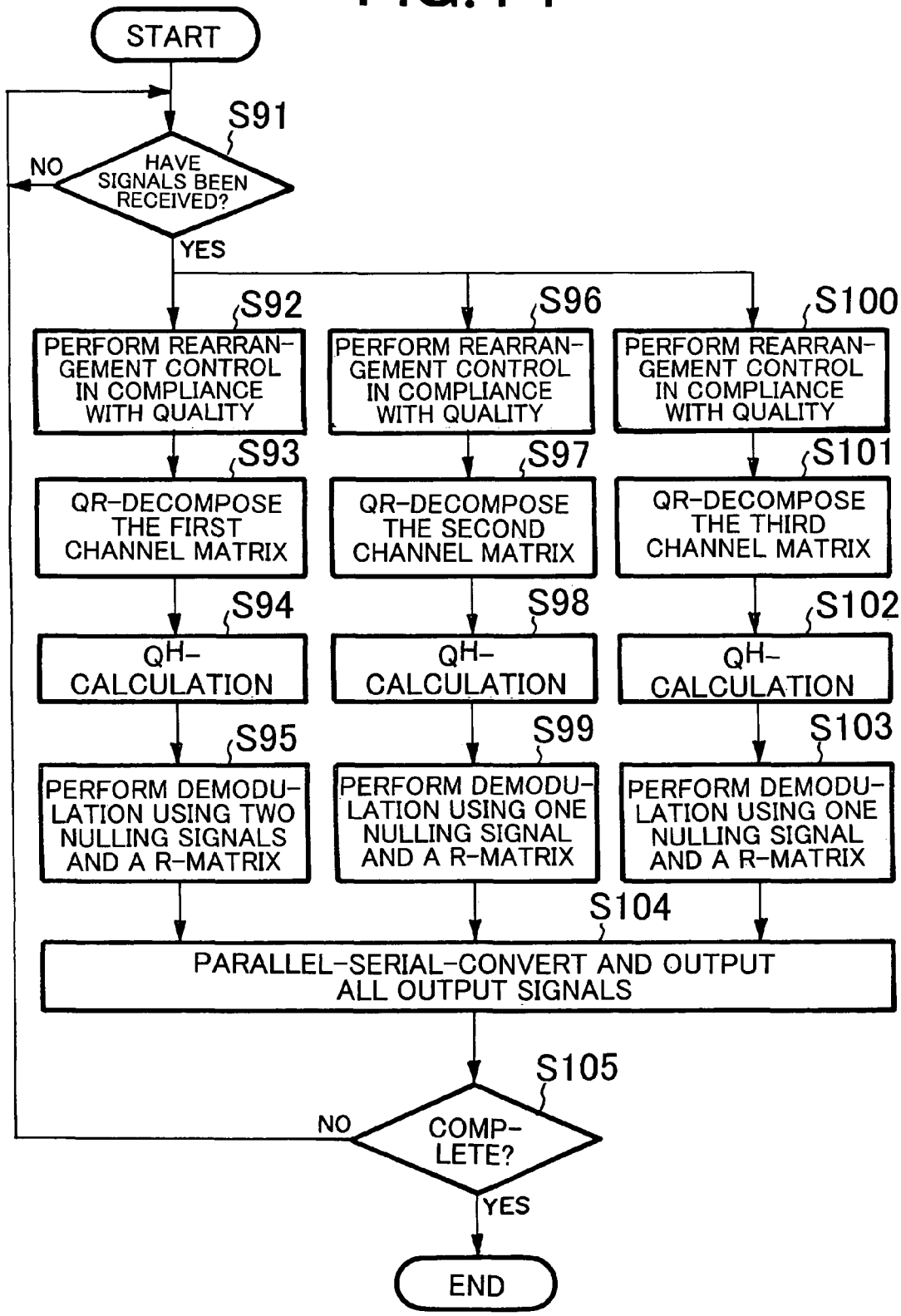
FIG. 14 is a flowchart showing a demodulation processing executed by a receiver shown in FIG. 13.

FIG. 14 is a flowchart showing demodulation processing of the receiver 9. Referring to FIGS. 13 and 14, the demodulation processing of the receiver 9 according to the present embodiment will now be described. Note that the processing shown in FIG. 14 is realized as a calculation device (not shown) in the receiver 9 executes a program stored in the recording medium 95.

In FIG. 14, at first, four reception antennae 11-1 to 11-4 respectively receive signals (step S91). Next, the rearrangement control device 92-1 measures the channel quality from the received signals r1 to r4, and generates a control signal x-ctrl1 which controls generation of the first channel matrix (step S92). Next, the QR-decomposition device 93-1 is inputted with the control signal x-ctrl1, and performs rearrangement of the channel matrix, thereby to determine the first channel matrix H1. The QR-decomposition device 93-1 thus carries out QR-decomposition, and outputs a Q-matrix Q1 and a R-matrix R1 (step S93). Next, like in the first embodiment, the $Q^H$-calculation device 57-1 and the demodulation device 53-1 perform nulling of the received signals r1 to r4 and demodulation of signals, and outputs two demodulated signals s1 and s2 (steps S94 and S95).

Like in the case described above, the rearrangement control devices 92-2 and 93-3 generate control signals x-ctrl2 and x-ctrl3 for generating second and third channel matrices H2 and H3 (steps S96 and S100). The QR-decomposition devices 93-2 and 93-3 perform QR-decomposition of the second and third channel matrices H2 and H3, and output Q-matrices Q2 and Q3, and R-matrices R2 and R3 (steps S97 and S101). Next, the $Q^H$-calculation devices 75-2 and 75-3 and the demodulation devices 73-2 and 73-3 perform nulling of the received signals r1 to r4 and demodulation of signals, like in the fifth embodiment. The demodulation devices 73-2 and 73-3 respectively output demodulated signals s3 and s4 (steps S98, S99, S102, and S103).

Next, the parallel-serial conversion device 54 performs parallel-serial conversion of four demodulated signals s1 to s4, and outputs the result as demodulated data s1 to s4 in a serial format (step S104). Next, whether or not there is any other signal received is detected (step S105). If there is any other received signal (step S105: NO), the processing returns to the step S91 and performs the same processing as described above. Otherwise, if there is no other signal received (step S105: YES), the processing is terminated.

Next, operations of the rearrangement control devices 92-1, 92-2, and 93-3 will be described.

As has been described previously in the fourth and fifth embodiments, the demodulation device 53-1 demodulates two signals from 272 replicas while the demodulation devices 73-2 and 73-3 each demodulate one signal from 16 replicas. At this time, the demodulation device 53-1 demodulates signals, using a greater number of replicas, and therefore, demodulated signals have higher accuracy. Hence, the rearrangement control devices 92-1, 92-2, and 92-3 perform control so as to demodulate signals having low quality by means of the demodulation device 53-1 and signals having excellent quality by means of the demodulation devices 73-2 and 73-3.

The rearrangement control device measures, for example, reception power of each transmission signal as quality. Suppose now that P1<P2<P3<P4 is given (P1, P2, P3, and P4 respectively denote reception powers of transmission signals 1, 2, 3, and 4). In this case, the rearrangement control device 92-1 performs control such that transmission signals 1 and 2 are demodulated by the demodulation device 53-1. The rearrangement control device 92-2 performs control such that transmission signal 3 is demodulated by the demodulation device 73-2. The rearrangement control device 92-3 performs control such that transmission signal 4 is demodulated by the demodulation device 73-3. More specifically, for example, control signals are outputted such that the first, second, and third channel matrices H1, H2, and H3 are as follows.

$$H1 = \begin{pmatrix} h13 & h14 & h11 & h12 \\ h23 & h24 & h21 & h22 \\ h33 & h34 & h31 & h32 \\ h43 & h44 & h41 & h42 \end{pmatrix}$$ [Formula 12]

$$H2 = \begin{pmatrix} h11 & h12 & h13 & h14 \\ h21 & h22 & h23 & h24 \\ h31 & h32 & h33 & h34 \\ h41 & h42 & h43 & h44 \end{pmatrix}$$

$$H3 = \begin{pmatrix} h11 & h13 & h14 & h12 \\ h21 & h23 & h24 & h22 \\ h31 & h33 & h34 & h32 \\ h41 & h43 & h44 & h42 \end{pmatrix}$$

As a result of this, according to the present embodiment, demodulation corresponding to the quality is possible between transmission signals. Therefore, improvements in accuracy of demodulated signals can be expected. The first, second, and third channel matrices are merely examples, and do not limit practice of the present invention.

Eighth Embodiment

Figure 15:
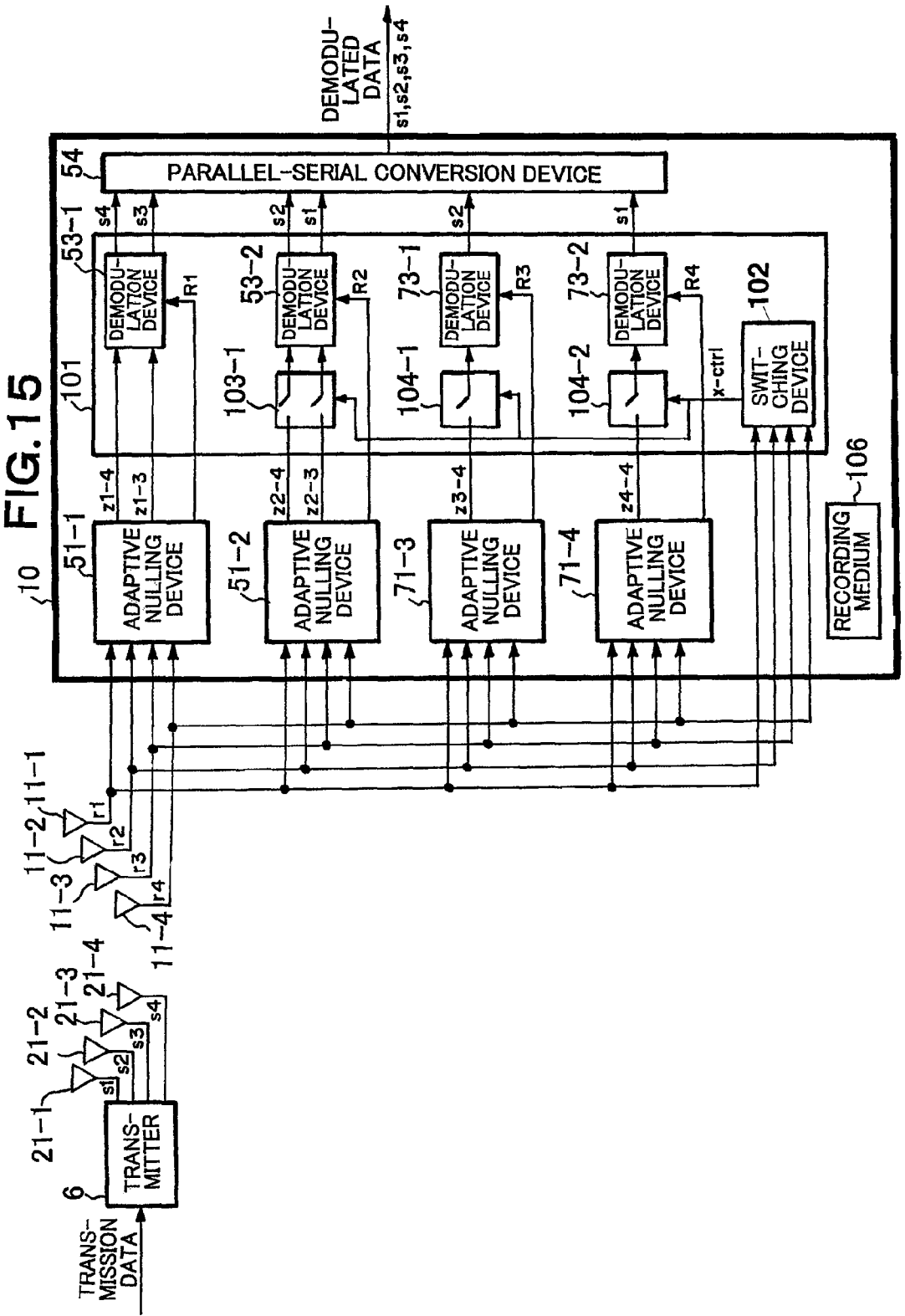
FIG. 15 is a block diagram showing the structure of a wireless communication system according to the eighth embodiment of the present invention.

FIG. 15 is a block diagram showing the structure of a receiver according to the eighth embodiment of the present invention. Referring to FIG. 15, the receiver 10 according to the present embodiment receives, through four reception antennae 11-1 to 11-4, signals s1 to s4 transmitted from the transmitter 6 through four transmission antennae 21-1 to 21-4. The receiver 10 demodulates and outputs signals r1 to r4 received. The receiver 10 has four adaptive nulling devices 51-1, 51-2, 71-3, and 71-4, an adaptive demodulation device 101, a parallel-serial conversion device 54, and a recording medium 106. The adaptive nulling devices 51-1, 51-2, 71-3, and 71-4 are connected to the output sides of the four reception antennae 11-1 to 11-4. The adaptive demodulation device 101 is connected to the output sides of the adaptive nulling devices 51-1, 51-2, 71-3, and 71-4. The parallel-serial conversion device 54 is connected to the output side of the adaptive demodulation device 101. The recording medium 106 stores a program to realize processing of respective sections in the receiver 10.

The demodulation device 101 has a demodulation device 53-1 connected to the output side of one adaptive nulling device 51-1, three switches 103-1, 104-1, and 104-2 connected to the output sides of three adaptive nulling devices 51-2, 71-3, and 71-4, three demodulation devices 53-2, 73-3, and 73-4 connected to the output sides of the switches 103-1, 104-1, and 104-2, and a witching device 102 connected to the output sides of the reception antennae 11-1 to 11-4.

Figure 16:
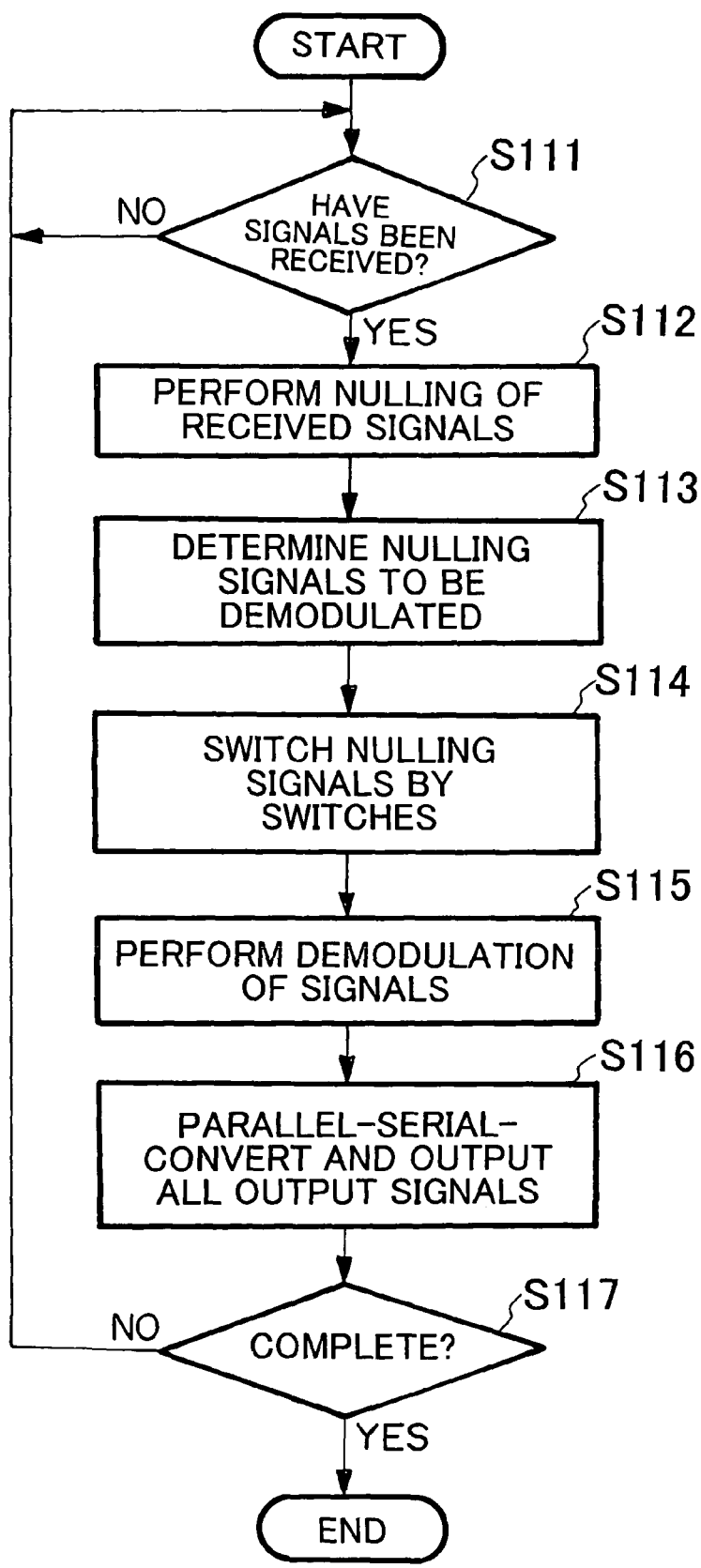
FIG. 16 is a flowchart showing a demodulation processing executed by a receiver shown in FIG. 15.

FIG. 16 is a flowchart showing demodulation processing of the receiver 10. Referring to FIGS. 15 and 16, the demodulation processing of the receiver 10 according to the present embodiment will now be described. Note that the processing shown in FIG. 16 is realized as a calculation device (not shown) in the receiver 10 executes a program stored in the recording medium 106.

In FIG. 16, at first, four reception antennae 11-1 to 11-4 respectively receive signals (step S111). Next, the four adaptive nulling devices 51-1, 51-2, 71-3, and 71-4 perform nulling of received signals r1 to r4 with use of channel matrices, like in the fourth and fifth embodiments. Each of the nulling devices outputs one or two nulling signals, e.g., the adaptive nulling devices 51-1, 51-2, 71-3, and 71-4 respectively output nulling signals z1-3 and z1-4, z2-3 and z2-4, and z3-4 and z4-4 (step S112).

Next, the switching device 102 included in the adaptive demodulation device 101 measures reception quality of signals transmitted through the four reception antennae 11-1 to 11-4, and outputs a control signal x-ctrl to the three switches 103-1, 104-1, and 104-2 (step S113).

Next, the three switches 103-1, 104-1, and 104-2 perform switching, based on the control signal x-ctrl from the switching device 102 (step S114). Next, four demodulation devices 53-1, 53-2, 73-3, and 73-4 perform demodulation of signals, like in the first and second embodiments. Two demodulated signals s3 and s4 are outputted from the one demodulation device 53-1, and two demodulated signals s1 and s2 which are switched based on the control signal x-ctrl among demodulated signals from the three demodulation devices 53-2, 73-3, and 73-4 are outputted (step S115).

Next, the parallel-serial conversion device 54 performs parallel-serial conversion of four demodulated signals s1 to s4, and outputs the result as demodulated data s1 to s4 in a serial format (step S116). Next, whether or not there is any other signal received is detected (step S117). If there is any other received signal (step S117: NO), the processing returns to the step S111 and performs the same processing as described above. Otherwise, if there is no other signal received (step S117: YES), the processing is terminated.

Next, the switching device 102 will be described.

The switching device 102 measures reception SNR (Signal to Noise Ratio) as quality of transmission signals. Suppose now that g4<g3<g2<g1 is given (g4, g3, g2, and g1 respectively denote reception SNR of transmission signals 4, 3, 2, and 1). In the present embodiment, the demodulation of two transmission signals s2 and s1 having high quality will be controlled.

Suppose now that g0 is a reference for the reception SNR. If g2<g0, i.e., the reception quality of the transmission signal 2 is lower than the reference, the switching device 102 controls the switch 103-1 to turn on and the switches 104-1 and 104-2 to turn off. As a result, the transmission signals s2 and s1 are demodulated from 256 replicas, as has been described in the fourth embodiment. In this case, total 544 replicas are required, including demodulation of the signals s3 and s4.

On the other side, if g2>g0, i.e., the reception quality of the transmission signal 2 is higher than the reference, the switching device 102 controls the switches 104-1 and 104-2 to turn on and the switch 103-1 to turn off. As a result, the transmission signals s2 and s1 are demodulated from 16 replicas, as has been described in the fifth embodiment. In this case, total 304 replicas are required.

Therefore, according to the present embodiment, demodulation can be realized by a small calculation amount if the quality is high. If the quality is low, the number of replicas used for demodulation is increased, so that demodulation with high accuracy can be expected. Accordingly, efficient control of calculation amount and demodulation accuracy can be expected.

Although two signals are adaptively demodulated in the present embodiment, this is an explanatory supposition and does not limit practice of the present invention.

Ninth Embodiment

Figure 17:
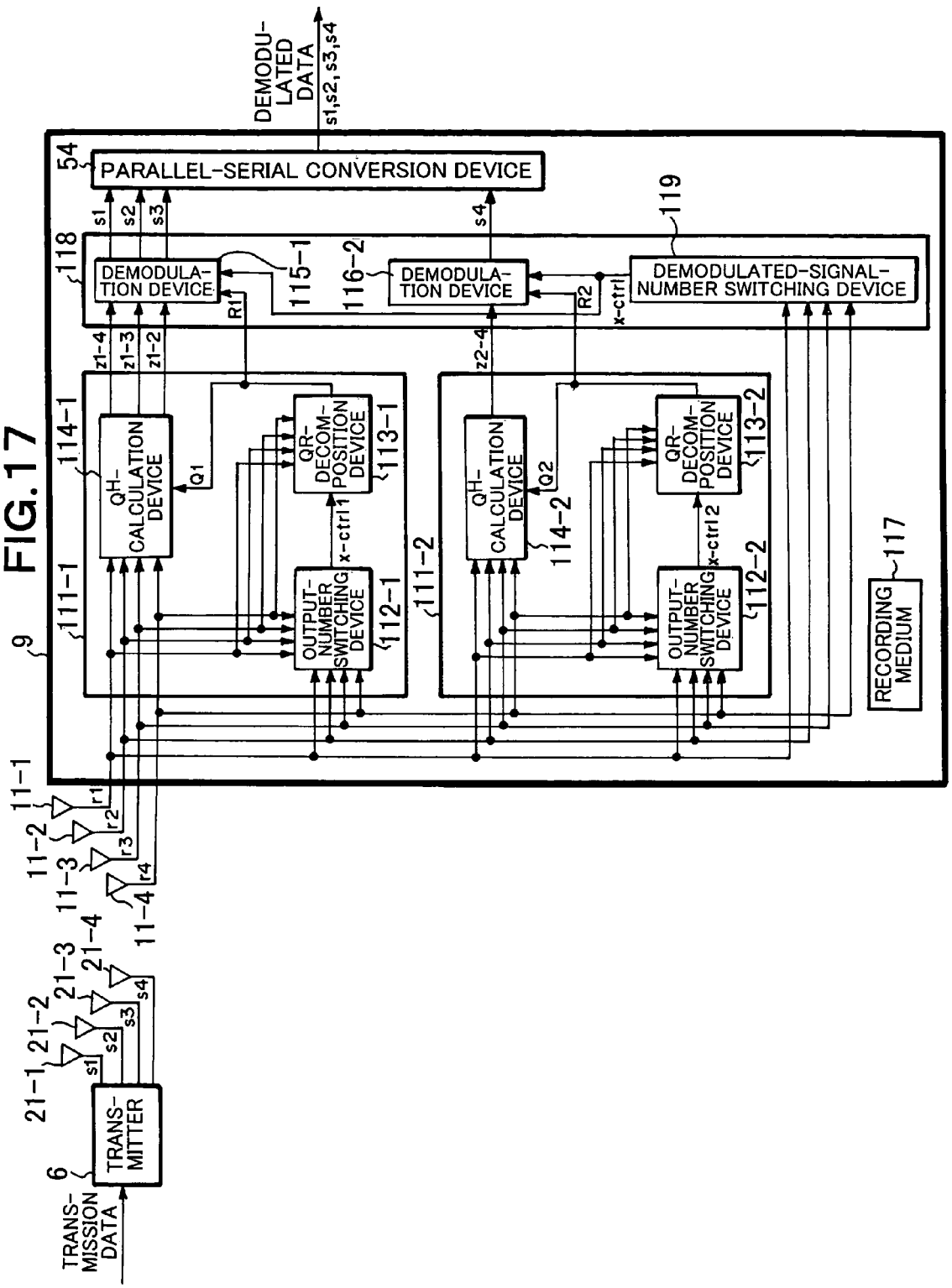
FIG. 17 is a block diagram showing the structure of a wireless communication system according to the ninth embodiment of the present invention.

FIG. 17 is a block diagram showing the structure of a receiver according to the ninth embodiment of the present invention.

Referring to FIG. 17, the receiver 11 according to the present embodiment receives, through the reception antennae 11-1 to 11-4, signals s1 to s4 transmitted from the transmitter 6 through four transmission antennae 21-1 to 21-4. The receiver 11 demodulates and outputs signals r1 to r4 received. The receiver 11 has two adaptive nulling devices 111-1 and 111-2, an adaptive demodulation device 118, a parallel-serial conversion device 54, and a recording medium 117. The adaptive nulling devices 111-1 and 111-2 are connected to the output sides of the four reception antennae 11-1 to 11-4. The adaptive demodulation device 118 is connected to the output side of each adaptive nulling device 111-1 and 111-2. The parallel-serial conversion device 54 is connected to the output side of the adaptive demodulation device 118. The recording medium 117 stores a program to realize processing of respective sections in the receiver 11.

The adaptive nulling device 111-1 has an output-number switching device 112-1, a QR-decomposition device 113-1, and $Q^H$-calculation device 114-1, which are connected in parallel with the output sides of the reception antennae 11-1 to 11-4. Likewise, the adaptive nulling device 111-2 has an output-number switching device 112-2, a QR-decomposition device 113-2, and a $Q^H$-calculation device 114-2, which are connected in parallel with the output sides of the reception antennae 11-1 to 11-4.

The adaptive demodulation device 118 has two demodulation devices 115-1 and 116-2 respectively connected to the output sides of two $Q^H$-calculation devices 114-1 and 114-2, and a demodulation-signal-number switching device 119 connected to the output sides of the reception antennae 11-1 to 11-4.

Figure 18:
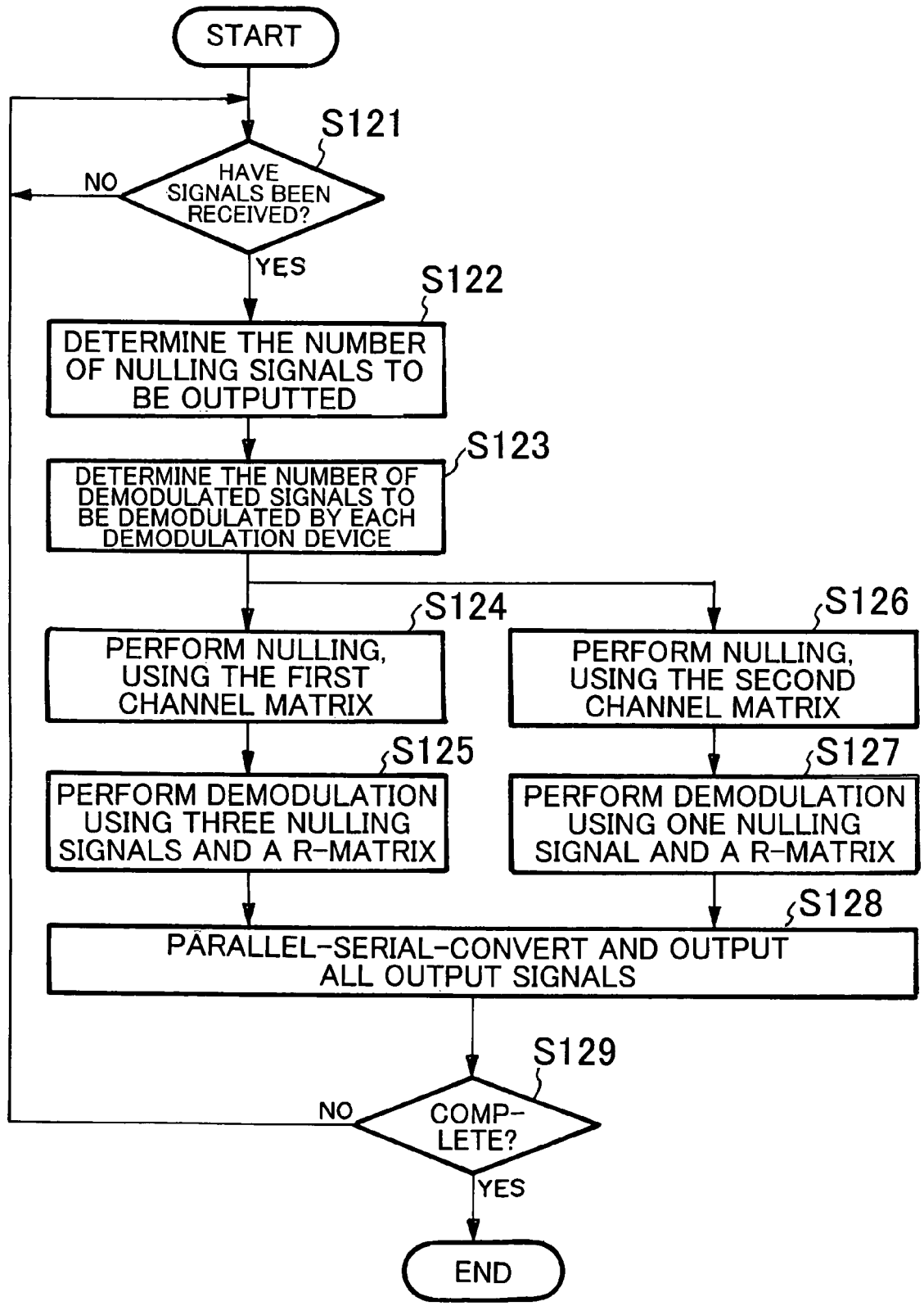
FIG. 18 is a flowchart showing a demodulation processing executed by a receiver shown in FIG. 17.
Figure 19:
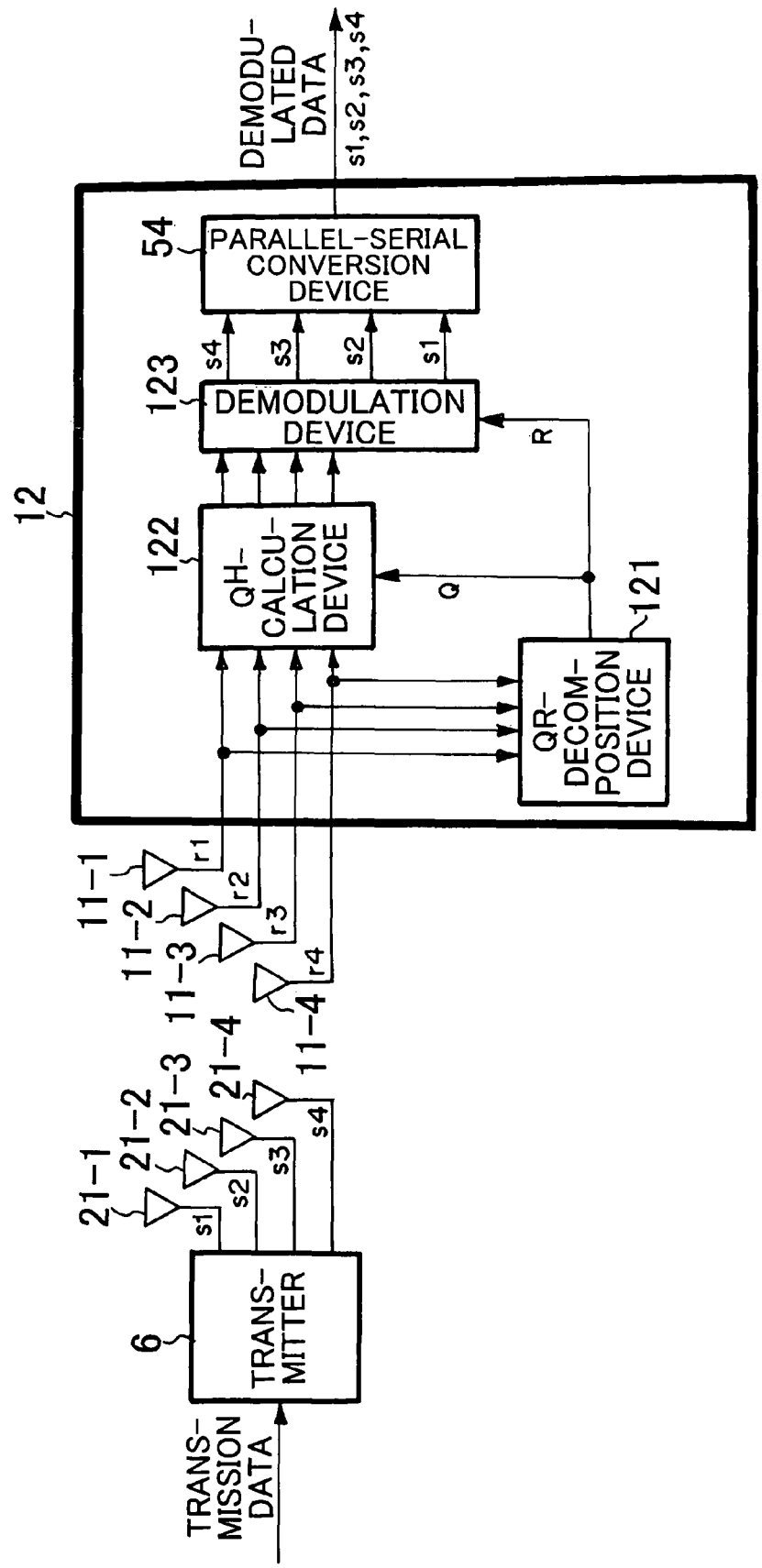
FIG. 19 is a block diagram showing the structure of a wireless communication system according to the related art.

FIG. 18 is a flowchart showing demodulation processing of the receiver 11. Referring to FIGS. 17 and 18, the demodulation processing of the receiver 11 according to the present embodiment will now be described. Note that the processing shown in FIG. 18 is realized as a calculation device (not shown) in the receiver 11 executes a program stored in the recording medium 117.

In FIG. 18, at first, four reception antennae 11-1 to 11-4 respectively receive signals (step S121). Next, two output-number switching devices 112-1 and 112-2 determine the number of nulling signals z1-4, z1-3, z1-2, and z2-4 outputted from the two $Q^H$-calculation devices 114-1 and 114-2, on the basis of the channel quality of transmission signals. The two output-number switching devices 112-1 and 112-2 output two control signals x-ctrl1 and x-ctrl2 concerning the determined number, to the two QR-decomposition devices 113-1 and 113-2, respectively (step S122). Next, the demodulated-signal-number switching device 119 determines the number of demodulated signals s1 to s4 outputted from the two demodulation devices 115-1 and 116-2, based on the channel quality of transmission signals. The demodulated-signal-number switching device 119 outputs a control signal x-ctrl concerning the number to each of the two demodulation devices 115-1 and 116-2 (step S123).

Next, the QR-decomposition device 113-1 performs QR-decomposition of the channel matrix, based on the control signal x-ctrl1 from the output-number switching device 112-1 and outputs a first channel matrix. The $Q^H$-calculation device 114-1 performs nulling of received signals r1 to r4, using the Q-matrix Q1 of the first channel matrix, and outputs three nulling signals z1-2, z1-3, and z1-4 (step S124). The demodulation device 115-1 demodulates three signals s1 to s3, using the three nulling signals z1-2, z1-3, and z1-4 and the R-matrix R1, and outputs demodulated signals (step 125).

On the other side, the QR-decomposition device 113-2 performs QR-decomposition of the channel matrix, based on the control signal x-ctrl2 from the output switching device 112-2 and outputs a second channel matrix. The $Q^H$-calculation device 114-2 performs nulling of received signals r1 to r4, using the Q-matrix Q2 of the second channel matrix, and outputs one nulling signal z2-4 (step S126). The demodulation device 116-2 demodulates one signal s4, using the one nulling signal z2-4 and the R-matrix R2, and outputs a demodulated signal (step 127).

Next, the parallel-serial conversion device 54 performs parallel-serial conversion of four demodulated signals s1 to s4, and outputs the result as demodulated data s1 to s4 in a serial format (step S128). Next, whether or not there is any other signal received is detected (step S129). If there is any other received signal (step S129: NO), the processing returns to the step S121 and performs the same processing as described above. Otherwise, if there is no other signal received (step S129: YES), the processing is terminated.

In this case, the demodulation device 115-1 requires 4096 replicas, and the demodulation device 116-2 requires 16 replicas. That is, total 4112 replicas are required. In addition, the first channel matrix H1 and the second channel matrix H2 are as follows.

$$H1 = \begin{pmatrix} h11 & h12 & h13 & h14 \\ h21 & h22 & h23 & h24 \\ h31 & h32 & h33 & h34 \\ h41 & h42 & h43 & h44 \end{pmatrix}$$ [Formula 13]

$$H2 = \begin{pmatrix} h13 & h14 & h12 & h11 \\ h23 & h24 & h22 & h21 \\ h33 & h34 & h32 & h31 \\ h43 & h44 & h42 & h41 \end{pmatrix}$$

If the quality of the transmission signal s4 is very excellent and if the quality of the transmission signals s1, s2, and s3 are evenly low, the transmission signal s4 can be easily demodulated with use of 16 replicas, and the transmission signals s1, s2, and s3 can be demodulated with very high accuracy with use of 4016 replicas, by adopting the present structure.

On the other side, if the output-number switching devices 112-1 and 112-2 determine that the number of nulling signals outputted from the $Q^H$-calculation devices 114-1 and 114-2 is two and if the demodulated-signal-number switching device 119 determines that the number of signals demodulated by each of the demodulation devices 115-1 and 116-2 is two, the number of replicas required by the demodulation devices 115-1 and 116-2 is 544 which is the same as that in the fourth embodiment (not shown).

For example, if the transmission signals s1, s2, s3, and s4 are of substantially uniform channel quality, the transmission signals can be demodulated with substantially uniform quality, with use of 544 replicas, by adopting the present structure. Therefore, adaptive signal demodulation corresponding to channel quality can be realized according to the structure of the present embodiment.

What is claimed is:

1. A wireless communication system comprising a receiver, which has N reception antennae (where N is an integer not smaller than 2) and receives and demodulates transmission signals from a transmitter having M transmission antennae (where M is an integer not smaller than 2), wherein the receiver comprises:

K adaptive nulling means of first to K-th adaptive nulling means (where K is not smaller than 2 and not greater than M) connected to the N reception antennae; and an adaptive demodulation means connected to the K-th adaptive nulling means, wherein the K adaptive nulling means includes k-th adaptive nulling means (where k is an integer not smaller than 1 and not greater than K) configured to orthogonalize received signals received by the reception antennae, with use of a matrix having, as its elements, channel coefficients between the reception antennae and the transmission antennae, to generate and output Lk nulling signals (where Lk is an integer not smaller than 1 and smaller than M and k denotes the k-th adaptive nulling means and is not smaller than 1 and not greater than K), and the adaptive demodulation means demodulates the received signals with use of the nulling signals, and outputs the received signals demodulated, and wherein the k-th adaptive nulling means comprises:

an adaptive control means which rearranges a channel matrix, in correspondence with quality of the transmission signals transmitted from the M transmission antennae; and a nulling means which generates the nulling signals from the received signals received by the N reception antennae, with use of the channel matrix and outputs the nulling signals.

2. The wireless communication system according to claim 1, wherein the adaptive demodulation means comprises:

K demodulation means for demodulating the received signals, with use of the nulling signals outputted by the K adaptive nulling means, and outputting the demodulated signals of the received signals.

3. The wireless communication system according to claim 1, wherein the K adaptive nulling means comprises:

nulling means for generating the nulling signals from the received signals received by the N reception antennae, and outputting the nulling signals generated.

4. The wireless communication system according to claim 1, wherein the adaptive demodulation means comprises:

K demodulation means which demodulate the received signals, with use of the nulling signals outputted by the K adaptive nulling means and output the demodulated signals; and selection/combining means which performs one or both of selection and combining processings, in correspondence with quality of the transmission signals transmitted from the M transmission antennae, and outputs the demodulated signals.

5. The wireless communication system according to claim 1, wherein the adaptive demodulation means comprises:

P demodulation means (where P is an integer not smaller than 1 and smaller than K), performs selection of the nulling signals, in correspondence with quality of the transmission signals transmitted from the M transmission antennae, and demodulates the received signals, with use of the nulling signals.

6. The wireless communication system according to claim 4, wherein the quality is a reception SINR (Signal to Interference-plus-Noise Ratio).

7. The wireless communication system according to claim 4, wherein the quality is a reception SNR (Signal to Noise Ratio).

8. The wireless communication system according to claim 4, wherein the quality is received power.

9. A receiver, which has N reception antennae (where N is an integer not smaller than 2) and receives and demodulates transmission signals from a transmitter having M transmission antennae (where M is an integer not smaller than 2), comprising:

K adaptive nulling means of first to K-th adaptive nulling means (where K is not smaller than 2 and not greater than M) connected to the N reception antennae; and an adaptive demodulation means connected to the K-th adaptive nulling means, wherein the K adaptive nulling means includes k-th adaptive nulling means (where k is an integer not smaller than 1 and not greater than K) configured to orthogonalize received signals received by the reception antennae, with use of a matrix having, as its elements, channel coefficients between the reception antennae and the transmission antennae, to generate and output Lk nulling signals (where Lk is an integer not smaller than 1 and smaller than M and k denotes the k-th adaptive nulling means and is not smaller than 1 and not greater than K), and the adaptive demodulation means demodulates the received signals with use of the nulling signals, and outputs the received signals demodulated, and wherein the k-th adaptive nulling means comprises:

an adaptive control means which rearranges a channel matrix, in correspondence with quality of the transmission signals transmitted from the M transmission antennae; and a nulling means which generates the nulling signals from the received signals received by the N reception antennae, with use of the channel matrix and outputs the nulling signals.

10. The receiver according to claim 9, wherein the adaptive demodulation means comprises:

K demodulation means for demodulating the received signals, with use of the nulling signals outputted by the K adaptive nulling means, and outputting the demodulated signals of the received signals.

11. The receiver according to claim 9, wherein the K adaptive nulling means comprises:

nulling means for generating the nulling signals from the received signals received by the N reception antennae, and outputting the nulling signals generated.

12. The receiver according to claim 9, wherein the adaptive demodulation means comprises:

K demodulation means which demodulate the received signals, with use of the nulling signals outputted by the K adaptive nulling means and output the demodulated signals; and selection/combining means which performs one or both of selection and combining processings, in correspondence with quality of the transmission signals transmitted from the M transmission antennae, and outputs the demodulated signals.

13. The receiver according to claim 9, wherein the adaptive demodulation means comprises:

P demodulation means (where P is an integer not smaller than 1 and smaller than K), performs selection of the nulling signals, in correspondence with quality of the transmission signals transmitted from the M transmission antennae, and demodulates the received signals, with use of the nulling signals.

14. The receiver according to claim 12, wherein the quality is a reception SINR (Signal to Interference-plus-Noise Ratio).

15. The receiver according to claim 12, wherein the quality is a reception SNR (Signal to Noise Ratio).

16. The receiver according to claim 12, wherein the quality is received power.

17. A demodulation method used in a receiver which has N reception antennae (where N is an integer not smaller than 2) and receives and demodulates transmission signals from a transmitter having M transmission antennae (where M is an integer not smaller than 2), the demodulation method comprising:

K adaptive nulling steps of first to K-th adaptive nulling step (where K is not smaller than 2 and not greater than M) including k-th adaptive nulling step (where k is an integer not smaller than 1 and not greater than K) of orthogonalizing received signals received by the reception antennae, with use of a matrix having, as its elements, channel coefficients between the reception antennae and the transmission antennae, to generate and output Lk nulling signals (where Lk is an integer not smaller than 1 and smaller than M and k denotes the k-th adaptive nulling means and is not smaller than 1 and not greater than K), and an adaptive demodulation step of demodulating the received signals with use of the nulling signals, and of outputting the received signals demodulated, wherein the k-th adaptive nulling step comprises:

an adaptive control step of rearranging a channel matrix, in correspondence with quality of the transmission signals transmitted from the M transmission antennae; and a nulling step of generating the nulling signals from the received signals received by the N reception antennae, with use of the channel matrix, and of outputting the nulling signals.

18. The demodulation method according to claim 17, wherein the adaptive demodulation step comprises:

K demodulation steps of demodulating the received signals, with use of the nulling signals outputted by the K adaptive nulling means, and outputting the demodulated signals of the received signals.

19. The demodulation method according to claim 17, wherein the K adaptive nulling steps comprises:

a nulling step of generating the nulling signals from the received signals received by the N reception antennae, and of outputting the nulling signals generated.

20. The demodulation method according to claim 17, wherein the adaptive demodulation means comprises:

K demodulation steps of demodulating the received signals, with use of the nulling signals outputted by the K adaptive nulling steps, and of outputting the demodulated signals; and a selection/combining step of performing one or both of selection and combining processings, in correspondence with quality of the transmission signals transmitted from the M transmission antennae, and of outputting the demodulated signals.

21. The demodulation method according to claim 17, wherein the adaptive demodulation step comprises:

P demodulation steps (where P is an integer not smaller than 1 and smaller than K) of performing selection of the nulling signals, in correspondence with quality of the transmission signals transmitted from the M transmission antennae, and of demodulating the received signals, with use of the nulling signals.

22. The demodulation method according to claim 20, wherein the quality is a reception SINR (Signal to Interference-plus-Noise Ratio).

23. The demodulation method according to claim 20, wherein the quality is a reception SNR (Signal to Noise Ratio).

24. The demodulation method according to claim 20, wherein the quality is received power.

25. A non-transitory computer-readable recording medium having embodied therein a program to execute a demodulation method of a receiver, which has N reception antennae (where N is an integer not smaller than 2) and receives and demodulates transmission signals from a transmitter having M transmission antennae (where M is an integer not smaller than 2), the demodulation method comprising:

K adaptive nulling steps of first to K-th adaptive nulling step (where K is not smaller than 2 and not greater than M) including k-th adaptive nulling step (where k is an integer not smaller than 1 and not greater than K) of orthogonalizing received signals received by the reception antennae, with use of a matrix having, as its elements, channel coefficients between the reception antennae and the transmission antennae, to generate and output Lk nulling signals (where Lk is an integer not smaller than 1 and smaller than M and k denotes the k-th adaptive nulling means and is not smaller than 1 and not greater than K), and an adaptive demodulation step of demodulating the received signals with use of the nulling signals, and of outputting the received signals demodulated, wherein the k-th adaptive nulling step comprises:

an adaptive control step of rearranging a channel matrix, in correspondence with quality of the transmission signals transmitted from the M transmission antennae; and a nulling step of generating the nulling signals from the received signals received by the N reception antennae, with use of the channel matrix, and of outputting the nulling signals.

* * * * *